United States Patent
Sri-Jayantha et al.

[19]

[11] Patent Number: 6,122,139
[45] Date of Patent: Sep. 19, 2000

[54] DISK DRIVE ROTARY ACTUATOR SYSTEM INCLUDING SYNCHRONOUS COUNTER TORQUE GENERATOR

[75] Inventors: Sri Muthuthamby Sri-Jayantha, Ossining; Arun Sharma, New Rochelle; Hien Phu Dang, Nanuet; Vijayeshwar Khanna, Ossining; Gerard McVicker, Stormville, all of N.Y.; Kiyoshi Satoh, Ayase, Japan; Yuzo Nakagawa, Hiratsuka, Japan; Naoyuki Kagami, Fujisawa, Japan

[73] Assignee: International Business Machines Corporation, Armonk, N.Y.

[21] Appl. No.: 09/119,184

[22] Filed: Jul. 20, 1998

[51] Int. Cl.[7] ................................................ G11B 33/14
[52] U.S. Cl. ............................................. 360/97.02
[58] Field of Search ......................... 360/97.01, 97.02, 360/104–106

[56] References Cited

U.S. PATENT DOCUMENTS

| | | |
|---|---|---|
| 4,967,293 | 10/1990 | Aruga et al. . |
| 5,016,131 | 5/1991 | Riggle ..................................... 360/106 |
| 5,327,061 | 7/1994 | Gullapalli . |
| 5,400,196 | 3/1995 | Moser et al. . |
| 5,713,438 | 2/1998 | Rossetti et al. . |

FOREIGN PATENT DOCUMENTS 2565637  10/1996  Japan .

*Primary Examiner*—A. J. Heinz
*Attorney, Agent, or Firm*—McGinn & Gibb, P.C.

[57] ABSTRACT

A disk drive system, includes an arm for mounting a head, and at least one component, coupled to the arm, for being synchronized to maintain a zero net angular momentum of the arm and the at least one component. Another disk drive system including a read/write head, includes a torque counter-generating member for being synchronized to maintain a zero net angular momentum of the head.

32 Claims, 19 Drawing Sheets

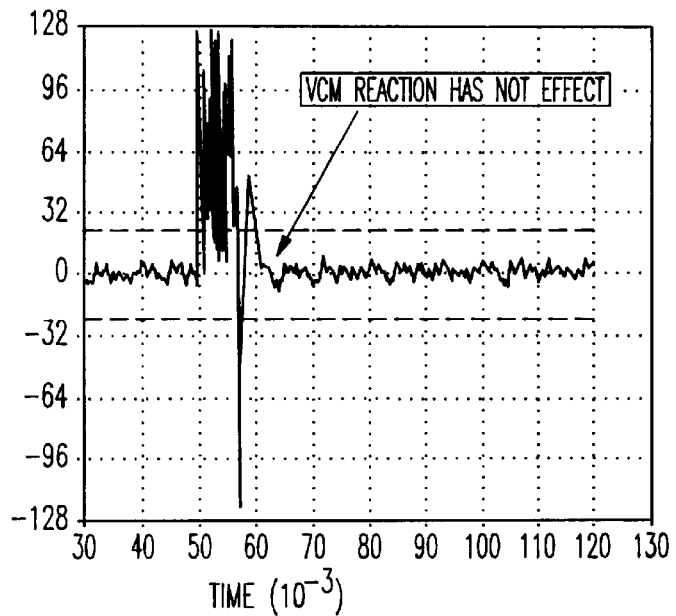
FIG.2A  RIGID FRAME
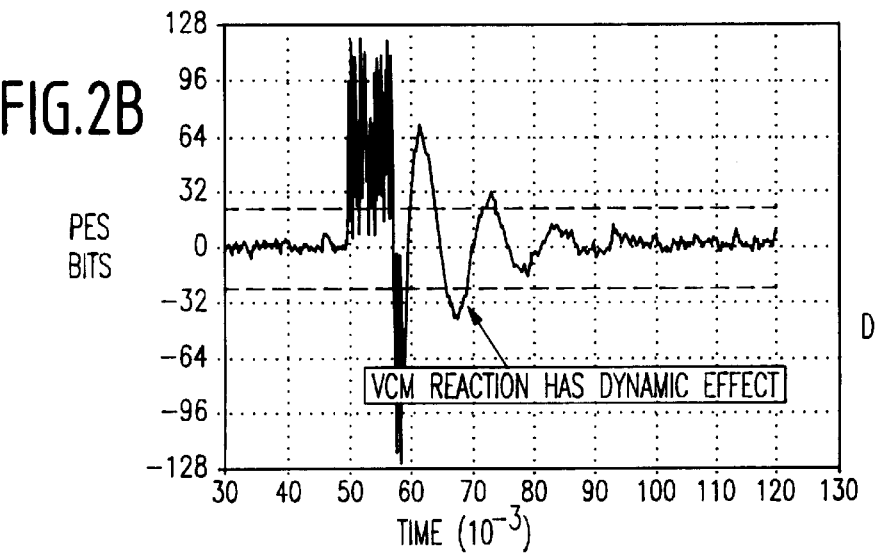
FIG.2B  10,000 TPI SETTLE DELAY ~13mS
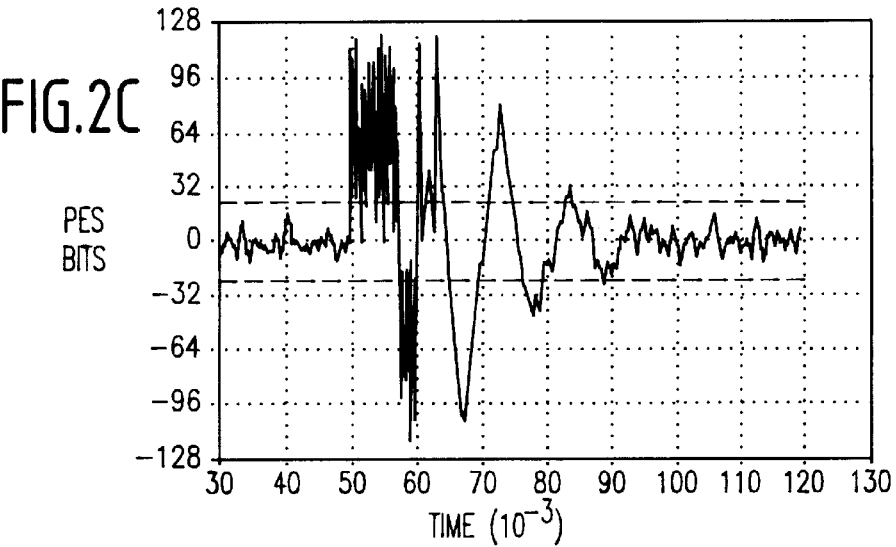
FIG.2C  25,000 TPI SETTLE DELAY ~30mS

FIG.5A
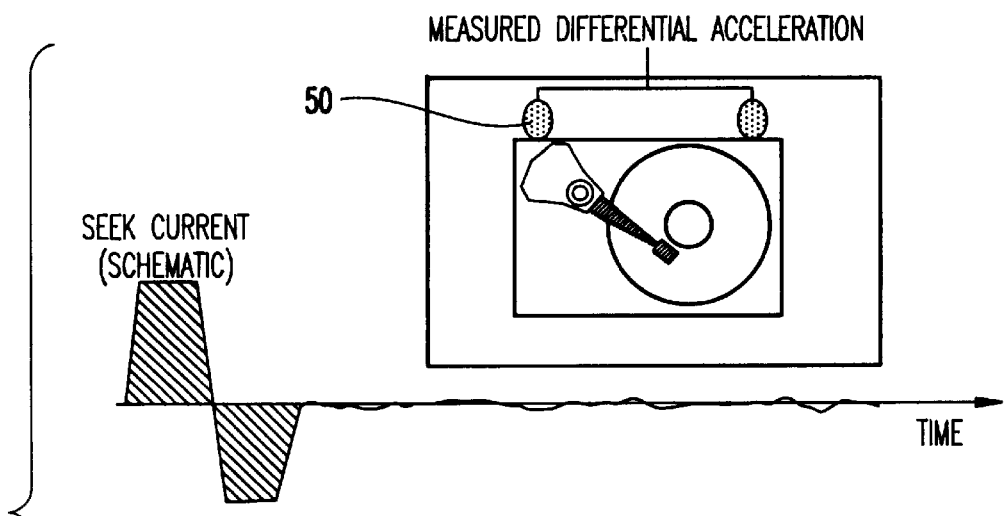
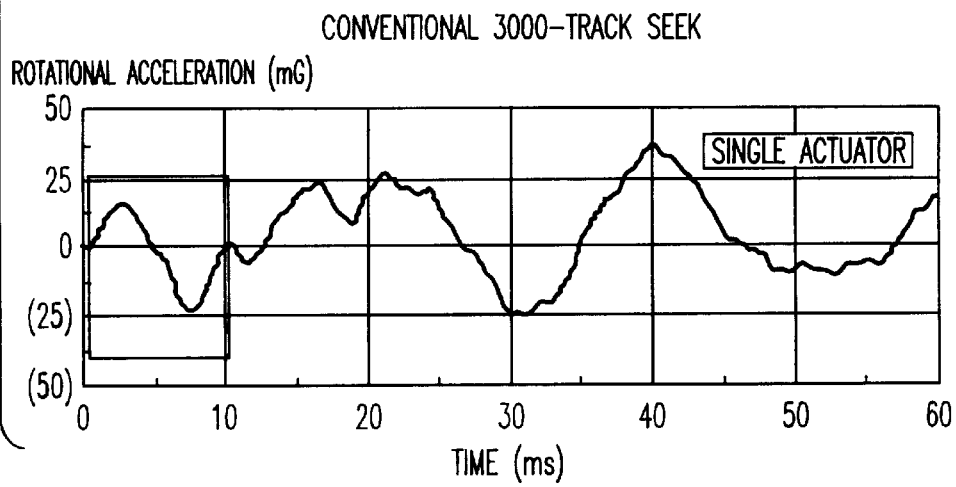
FIG.5B
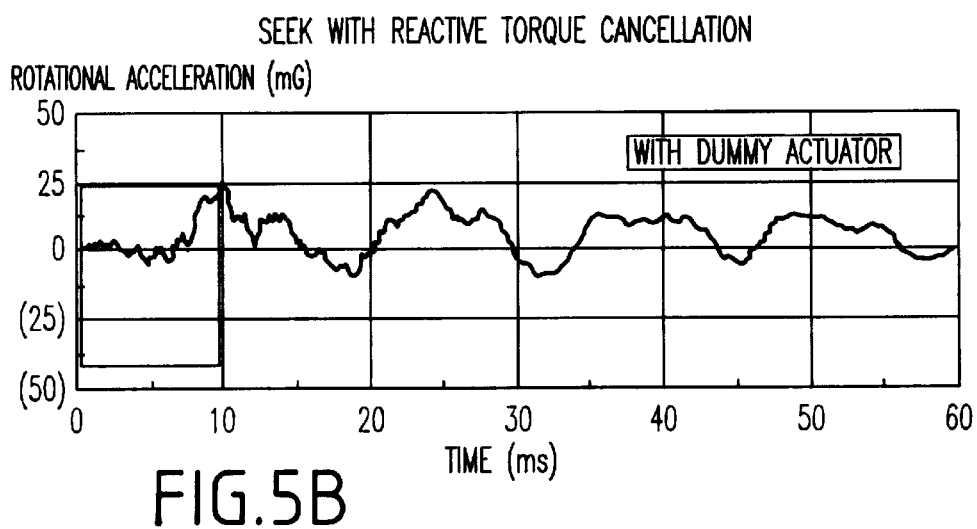

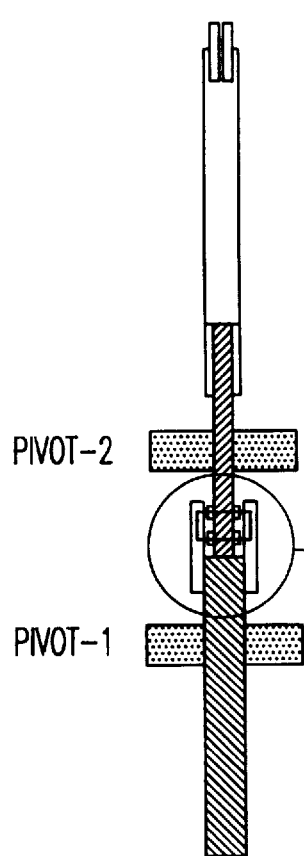
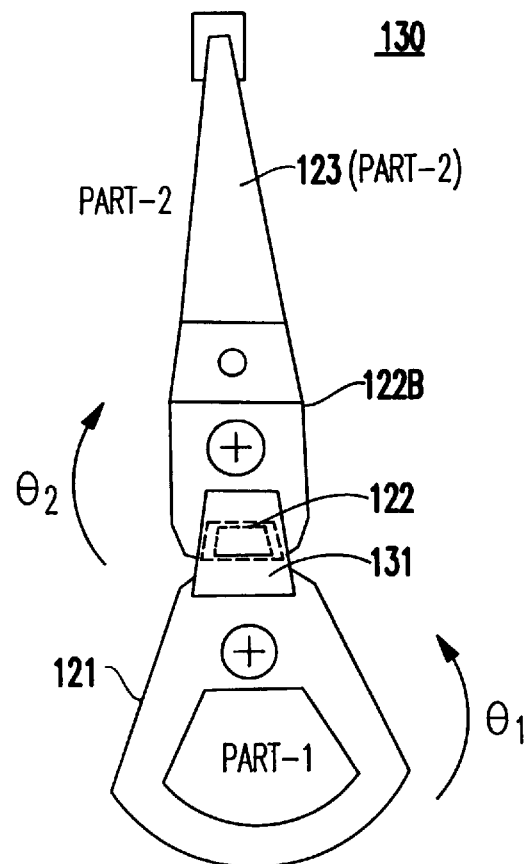
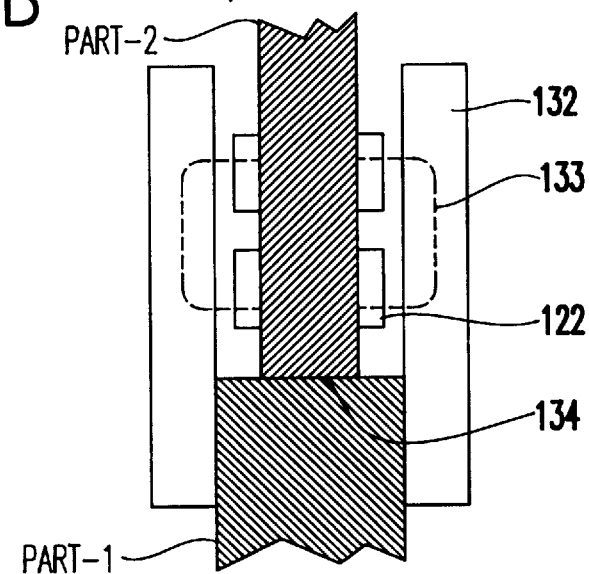
FIG.13B
FIG.13A
FIG.13C

DISK DRIVE ROTARY ACTUATOR SYSTEM INCLUDING SYNCHRONOUS COUNTER TORQUE GENERATOR

BACKGROUND OF THE INVENTION

1. Field of the Invention

The present invention generally relates to a disk drive, and more particularly to a disk drive including a rotary actuator system for compensating for vibratory components during a seek time of a head of the disk drive.

2. Description of the Related Art

Present 2.5" and 3.5" disk drives (e.g., hard disk drives (HDDs)) are designed to operate in portable and desk-top/server environments, respectively. To reduce cost and weight of a computer system, manufacturers typically fabricate the HDD mounting frame utilizing thin structural members. Therefore, the computer mounting frame is a compliant object prone to vibration. Such a mounting configuration makes the disk drive vulnerable to vibration excited by internal or external sources. More specifically, a HDD with a rotary actuator system is highly sensitive to rotational vibration of its baseplate.

Moreover, a head positioning servo system in an HDD performs several critical tasks.

First, it moves the head to the vicinity of a target in a minimum time using a velocity servo under a seek mode. The head positioning servo system also positions the head on the target track with minimum settle-out time using a position controller without an integrator in it. Finally, the servo system enters the track follow mode with a proportional-integral-derivative-type (PID) position controller.

During a seek mode maximum, rotational acceleration and deceleration torque is imparted by a voice coil motor (VCM)-based actuator. The corresponding reaction torque on the baseplate causes transient rotational vibration that can be detrimental to the positioning accuracy of the read/write heads.

Currently, disk drives have reached 15,000 tracks per inch (TPI), and by year 2000 it is expected to grow above 25,000 TPI. A major obstacle to raising the track density is inadequate head positioning accuracy in the presence of vibration disturbances. Due to exponential growth in TPI, positioning the read/write elements over a track has become a major challenge. Conventional servo control systems require continuous innovations to perform well under increasingly difficult operating conditions.

Furthermore, the mechanical components such as spindle motor assemblies are not perfectly mass-balanced, and during operation they produce harmonic vibration. Harmonic vibration excitation produces both a linear and a rotational oscillatory motion of the entire HDD system. At a 15 kTPI design point, a rotational oscillatory motion of a track with respect to the actuator pivot of about 0.01 thousandth of an inch (i.e., 0.25 micrometer) corresponds to 15% of the track pitch.

When not compensated, a track following error of 15% of track pitch can be detrimental to a disk drive's "soft" and "hard" error rate performance. The positioning error due to this internally produced periodic vibration may be solved using a conventional servo method.

Further, by using a special conventional shock and vibration isolation mount design, the rotational oscillatory components due to internal spindle forces may be minimized.

However, the conventional mount design optimized to decouple internal spindle vibration remains susceptible to external input vibration. By deploying the isolation mounts along a polygon satisfying a particular set of criteria, the externally-generated rotational vibration also can be minimized.

While a unique isolation system could be developed in an attempt to solve vibration problems, it is difficult to commercialize an HDD if each computer manufacturer must achieve a design having low rotational vibrations.

Furthermore, it is noted that using sensors, servo algorithms, and inertial force generators to reduce vibration problem is generally known in the field. However, each application area requires an innovative solution to solve a specific problem.

Thus, as noted above, the seek reaction torque of an HDD acting on its baseplate that is mounted on a weak computer frame can cause a transient vibration. The transient vibration problem arises from several mechanisms.

First, as noted above, transient vibrations arise from a net reaction torque acting on the baseplate causing low frequency (on the order of approximately 100–200 Hz) rigid body oscillations of the baseplate. Secondly, a rotary actuator pivot is coupled to the baseplate casting, and VCM magnets are attached to the baseplate, causing high frequency modal mechanics (2–3 kHz) within the baseplate structure.

The first-mentioned problem has been observed in disk drives with linear actuators, and a feedforward servo solution using a sensor has been proposed for solving such a problem. However, due to the high cost of a reliable and accurate sensor to detect fine motion, a sensor-based solution is considered to be less attractive in low cost HDDs.

The second form of vibration resulting in high frequency modal mechanics is not considered to be a major detractor. However, the high frequency problem can be reduced using a conventional, pure torque generating actuator. An intermediate solution to a pure torque generation has also been proposed. Further, to reduce the severity of reaction force some linear VCM designs have included compliant mounting of the VCM magnets.

Thus, the conventional hard disk drives suffer from serious problems which affect their performance in terms of seek time and the like in a disk drive. Seek time includes two components: move-time and settle-out-time. During a seek, an actuator is driven at high acceleration by an electromagnetically generated torque. Transient dynamics of a hard disk drive (HDD) impact its settle-out time.

Specifically, during a rotational seek motion of a rotary actuator system, a strong reaction torque is applied to a baseplate. The torque is transferred to the baseplate through a magnet housing and actuator pivot assembly. This reaction torque excites the baseplate to vibrate when a disk drive is mounted on a compliant computer structure. The rotational vibration mode of the baseplate in a disk drive having a rotary actuator-based head positioning system causes a transient position error component. The baseplate transient dynamics may last for 20 to 30 ms (or more) following a seek and may impact the settle-out time.

With an ever increasing track density in magnetic disk drives, the reaction-induced vibratory component will degrade a disk drive's access time performance substantially.

SUMMARY OF THE INVENTION

In view of the foregoing and other problems of the conventional systems, it is an object of the present invention to provide an improved disk drive system.

A second object of the present invention is to provide a disk drive system which is designed to be most robust against vibration.

Another object of the present invention is to provide a system for solving the problem of transient dynamics caused by actuator seek motion by generating a synchronous counter torque without using a motion sensor for baseplate acceleration sensing.

Yet another object is to provide a system in which the net angular momentum, which is a vector sum of all individual angular momenta, is maintained at zero.

In a first aspect, a system is provided which employs electronic synchronization of two independently rotatable components.

Since the seek motion and the corresponding seek torque of a disk drive is predictable, in the first aspect, the invention solves the seek induced vibration problem by explicitly generating a synchronous counter torque by providing a second independent rotary actuator.

In a preferred embodiment, the torque canceling actuator either may be a dummy actuator that is uniquely designed for torque cancellation, or may be a second actuator intended to transport a subset of read/write (R/W) heads.

In the present invention, multiple actuators may be used to generate a synchronous counter torque by pairing two actuators per seek without constraining the second actuator to do the read/write functions. Generally under this configuration, there should be 2n actuators made available (where n=1, 2, . . . and 2n being an even number) so that n actuators could perform seek and read/write functions independently while the other n actuators are employed to generate the counter torque associated with a corresponding read/write actuator. In the case of an odd number of multiple actuators, the last unpaired actuator has to be put on idle mode while the pair ones are used for synchronous torque cancellation.

In the event that "m" number of total independent actuators are deployed to make "m" independent seeks, a single dummy actuator can be used to counter-balance the total reaction torque generated by the actuators. Under the worst case condition, the dummy actuator should have the capability to generate the maximum torque generated by all "m" actuators, even though statistically a compromised design with less torque generating capability for a dummy actuator can be considered.

In a second aspect, a system is provided which maintains synchronous momentum (and therefore torque) control mechanically. In the second aspect of the invention, the above-mentioned problem is solved by modifying a single actuator system into a multiple component design so that the net inertial angular momentum due to the actuator motion is kept at zero so that the baseplate is not subject to a net torque.

Thus, with the invention, in the first case, an independent second actuator is electronically synchronized (or mechanically provided) to achieve zero net angular moment objective, whereas in the second aspect only a single torque generating seek actuator is used with novel modification. The second approach requires only one actuating device thereby contributing to lower component cost.

A third approach to the counter torque generation method is to keep the main voice coil motor (VCM) actuator as a single body pivoting about its pivot axis while allowing a rotating VCM magnet/yoke assembly to help reduce the reaction torque transmitted to the baseplate by a novel redesign. Thus, reaction torque is minimized by using the rotatable magnet/yoke assembly. Rotation is provided by mounting the magnet/yoke structure on a pivot system. The center of rotation of this pivot is made the same as that of the actuator with a ball bearing system being provided for the pivot.

To minimize the size of this bearing, a sliding/rolling contact may be provided at the extremity of the yoke furthest away from the pivot point, for further support. The intent of making the yoke pivot at the same point as the actuator pivot is to get the reaction force that the yoke imparts to the pivot to cancel out the force the actuator imparts to the pivot point.

Thus, the third approach not only cancels out the torque component but also reduces the net linear force acting on the baseplate at the pivot point. Since the mass and moment of inertia of the magnet/yolk structure is significantly greater than that of the actuator, the degree of motion allowed to the magnet/yoke structure can be much lower than the full motion the actuator will undergo.

In a modification of this design of the third approach, if exact torque cancellation is desired, a mass-balanced yoke structure can be designed.

A fourth approach exploits the HDD's spindle motor as the "dummy actuator" to generate the counter torque during the seek. This approach allows the existing spindle motor hardware to be exploited without additional cost. Provided that the track positioning information can be innovatively measured under varying motor speed, the actuator induced seek reaction torque is counter balanced by applying a counter torque to the spindle motor. Hence, the fourth approach involves a low cost solution employing the spindle motor itself as the "dummy" actuator.

BRIEF DESCRIPTION OF THE DRAWINGS

The foregoing and other objects, aspects and advantages will be better understood from the following detailed description of preferred embodiments of the invention with reference to the drawings, in which:

FIGS. 2A–2C respectively illustrate estimated settle-out position error signals (PES) for a rigid computer frame, a typical computer frame (with 10 kTPI HDD), and another typical computer frame (with 25 kTPI HDD);

FIGS. 5A and 5B respectively illustrate an experimental data of rotational mechanics due to seek without a counter torque generator and with a counter torque generator;

Figure 9A:
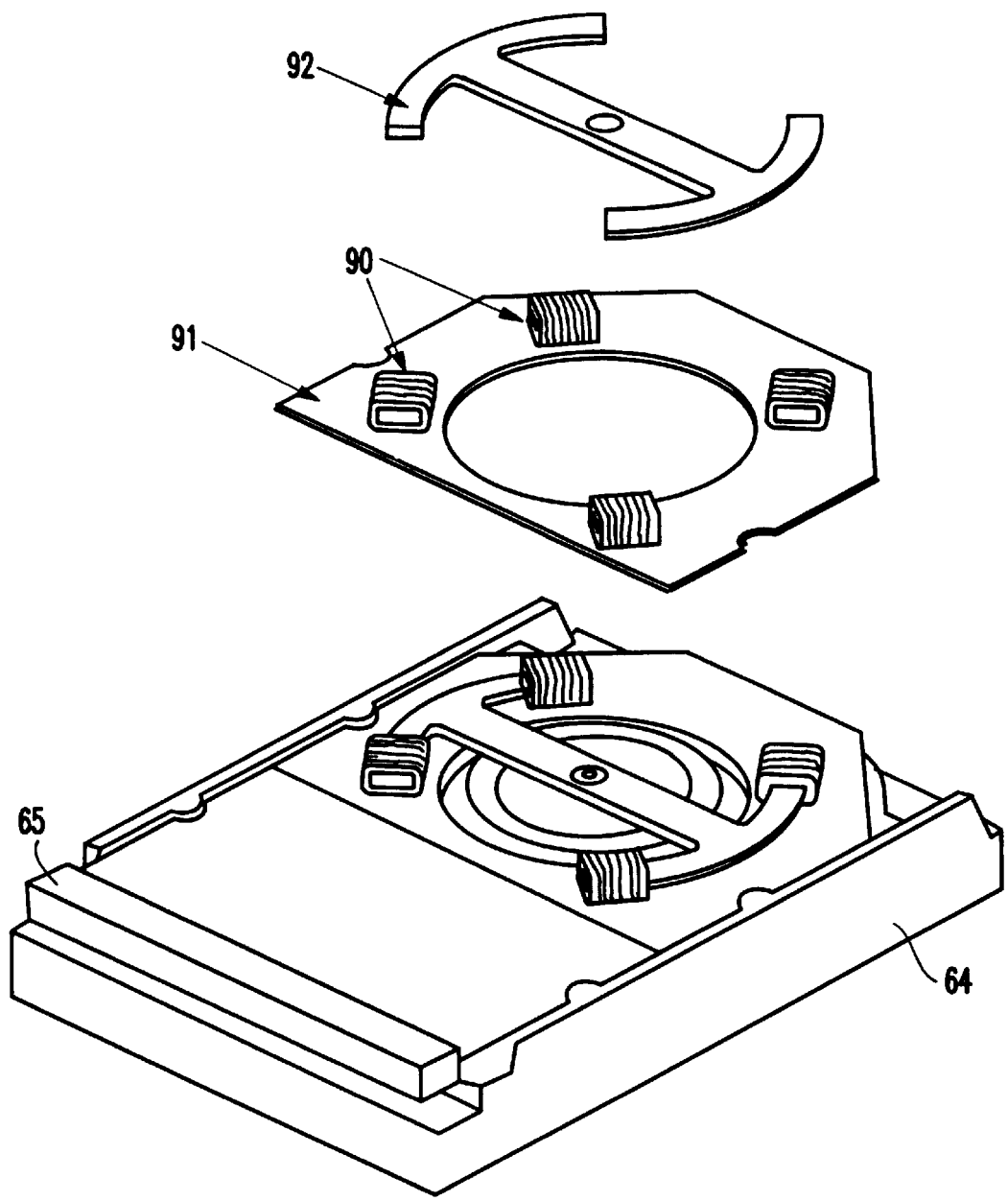
Figure 9B:
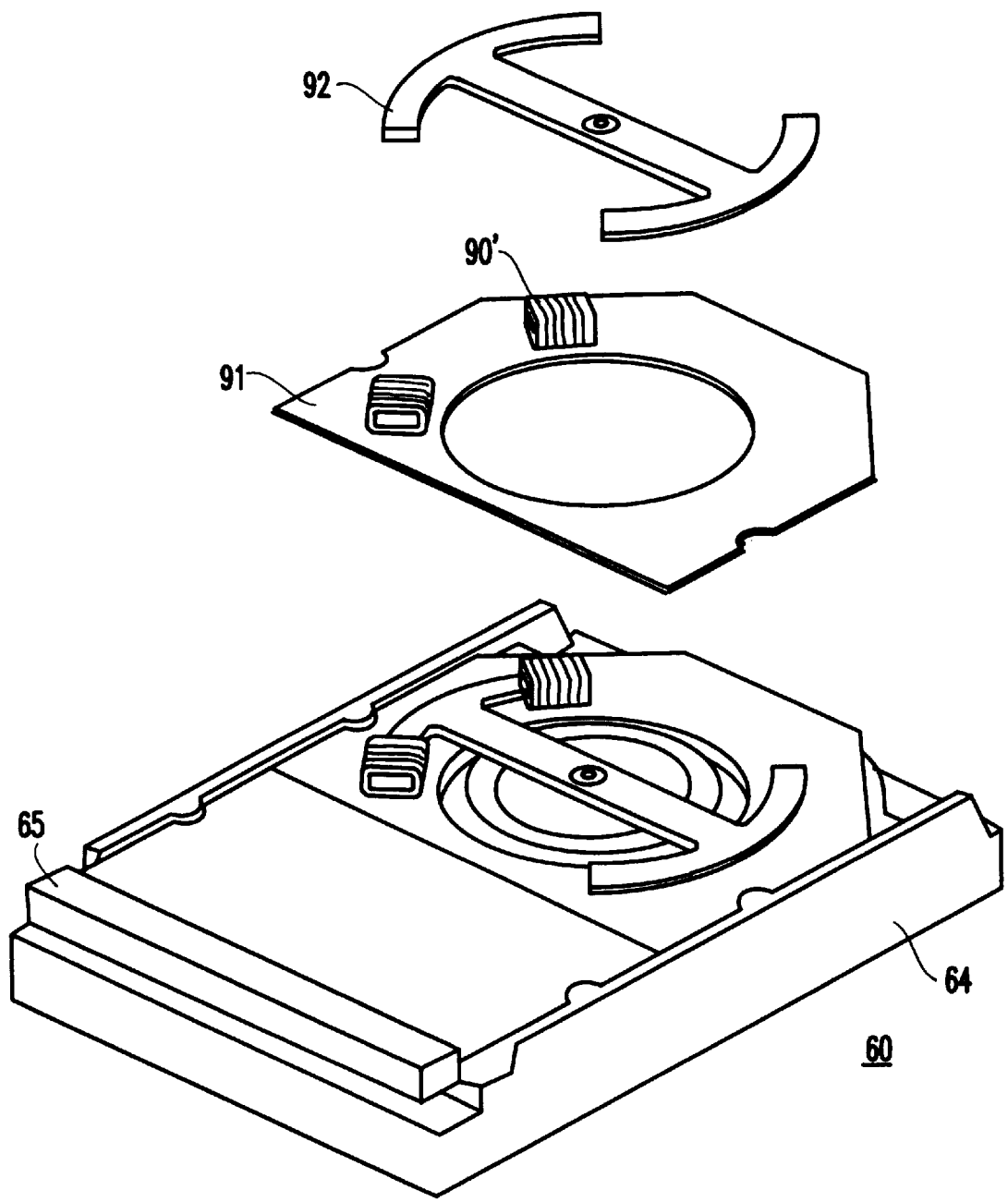
Figure 10:
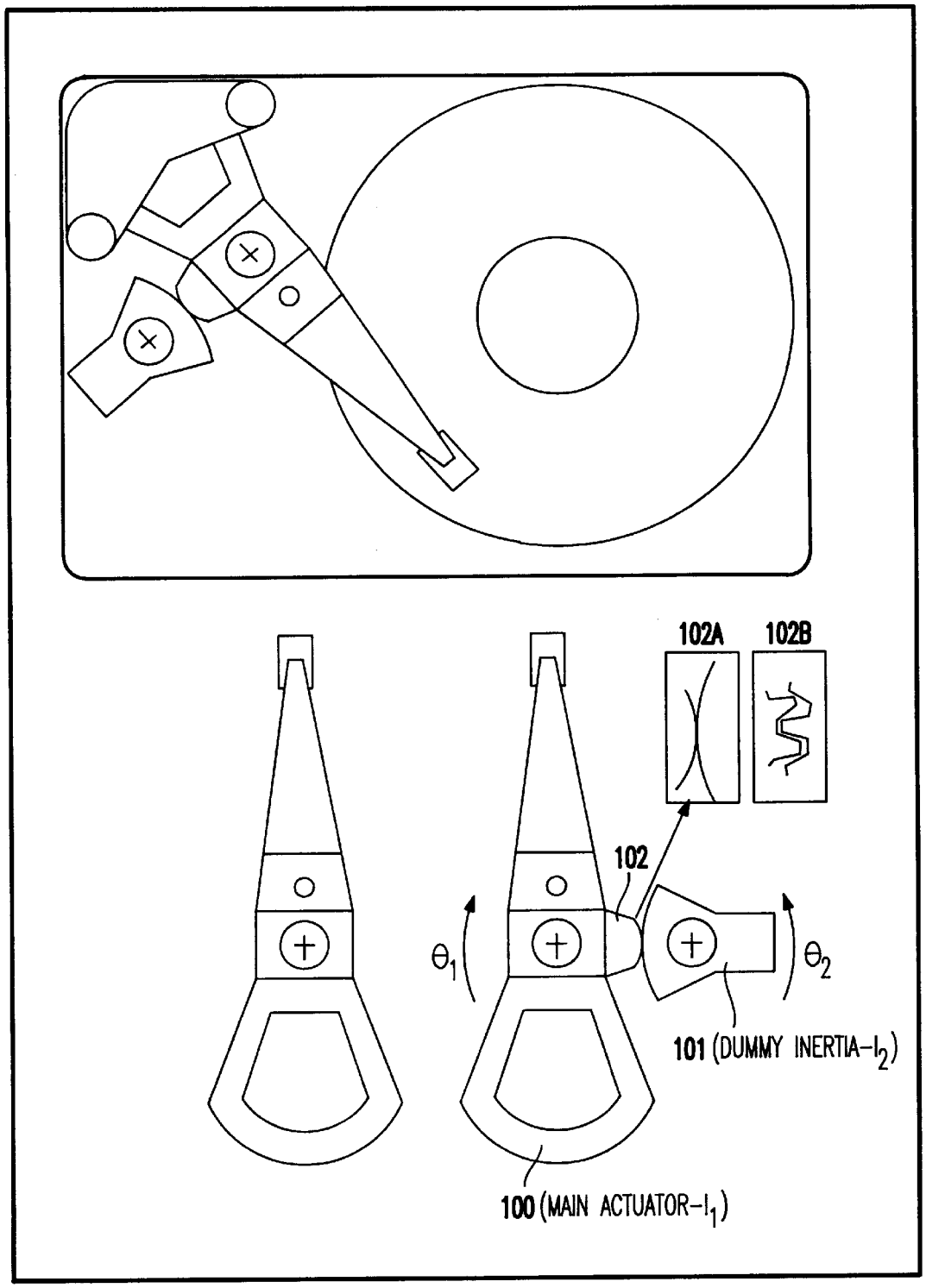
Figure 11:
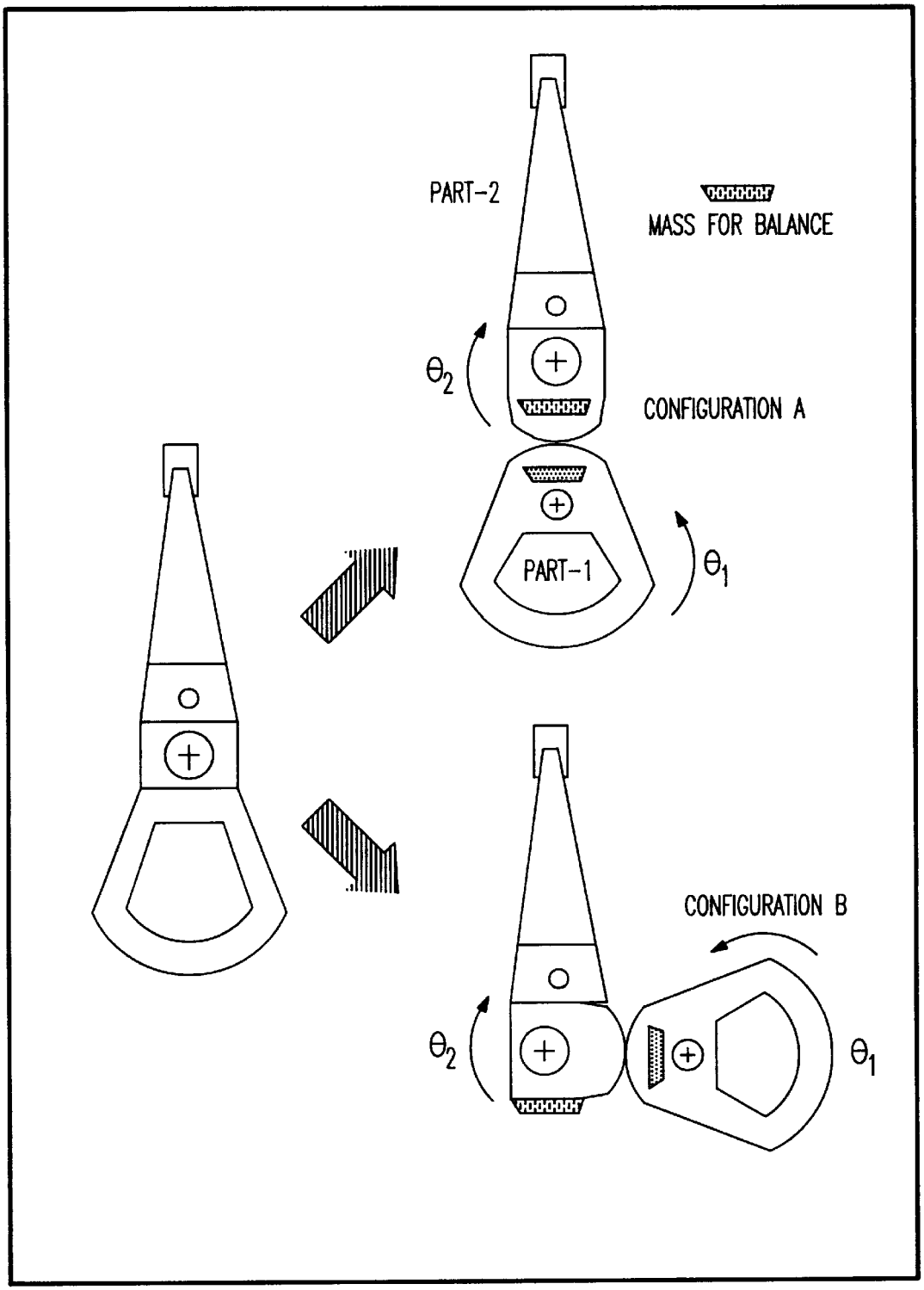
Figure 12:
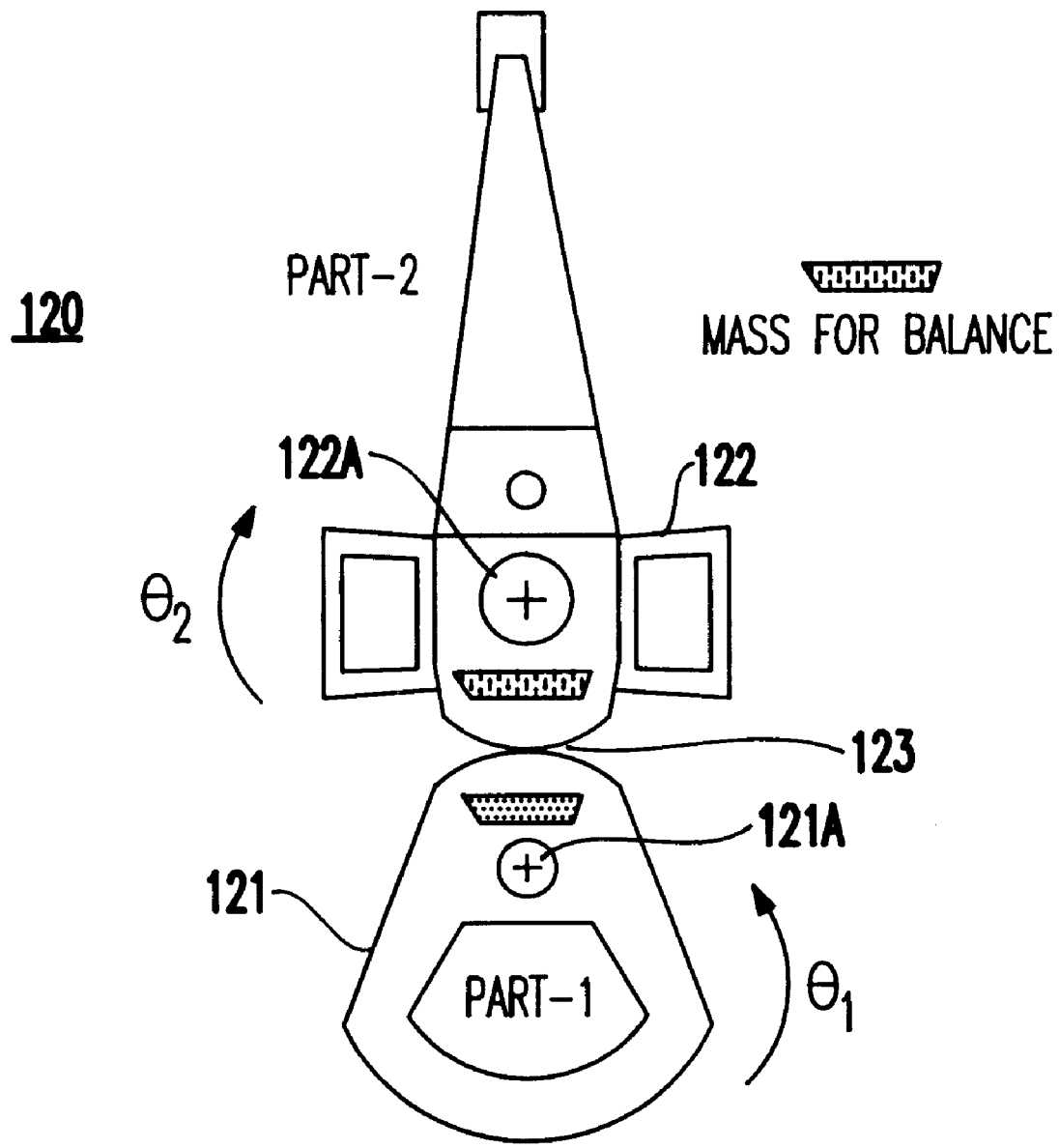
Figure 14:
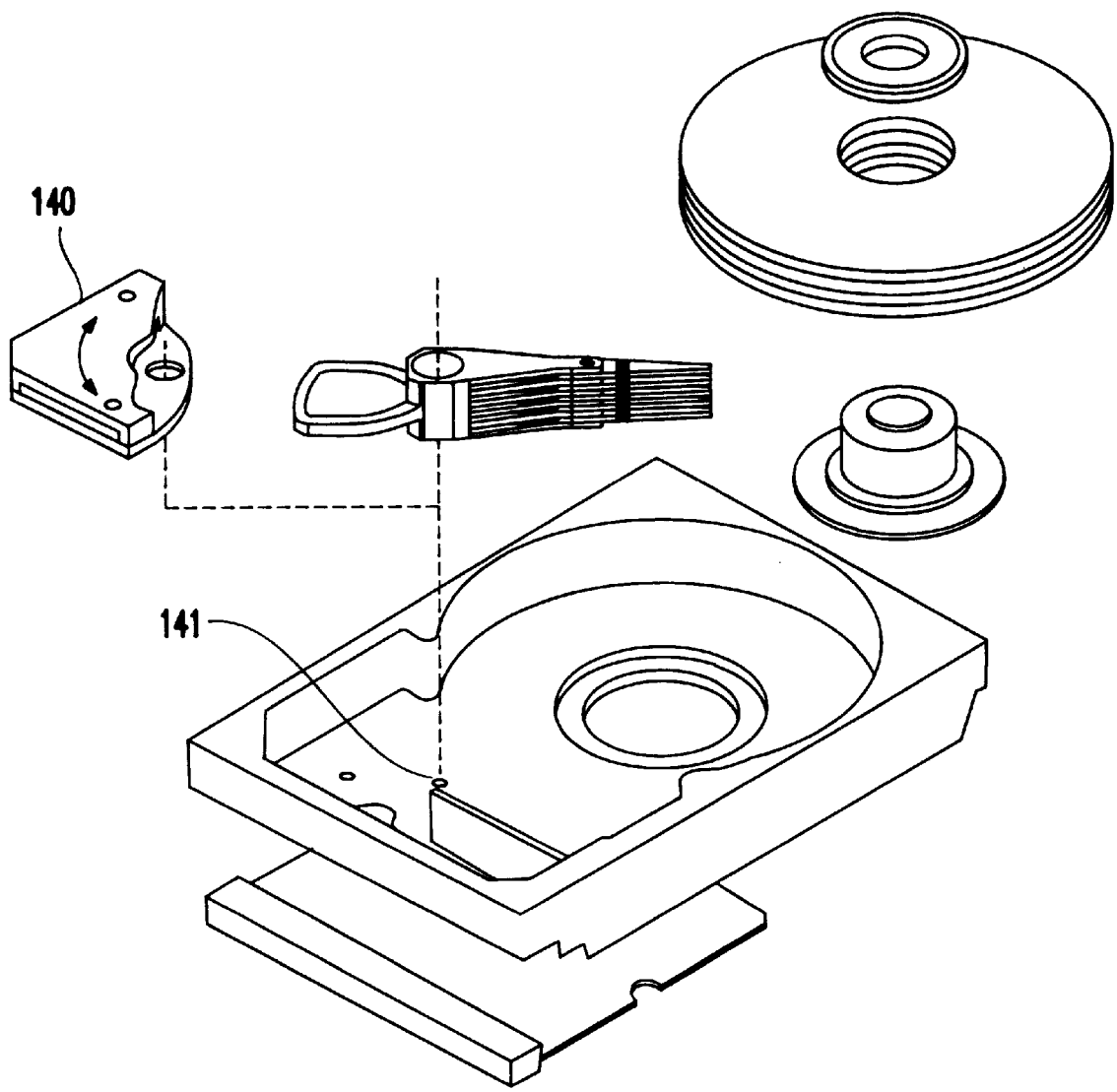
Figure 15:
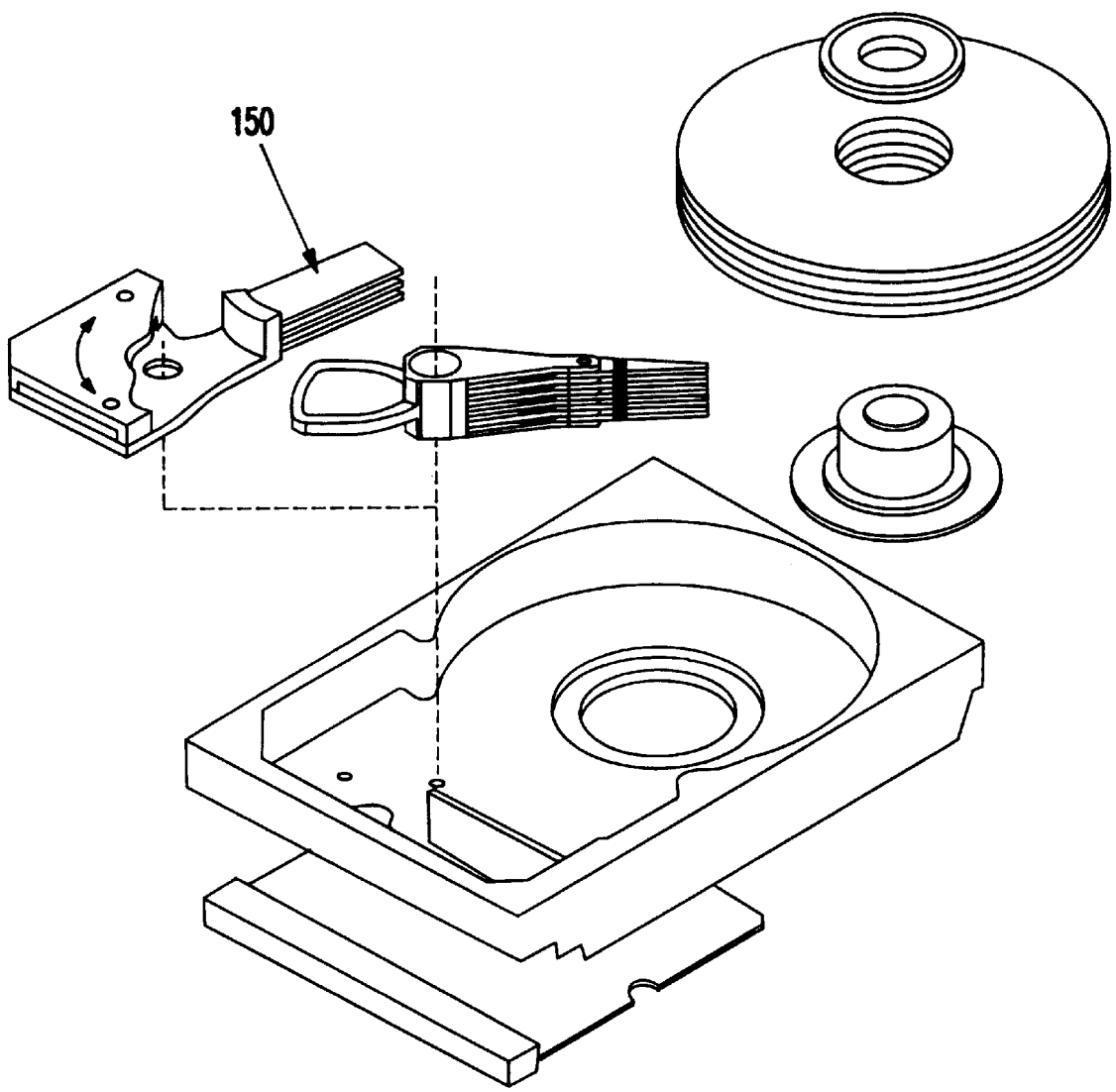
Figure 16:
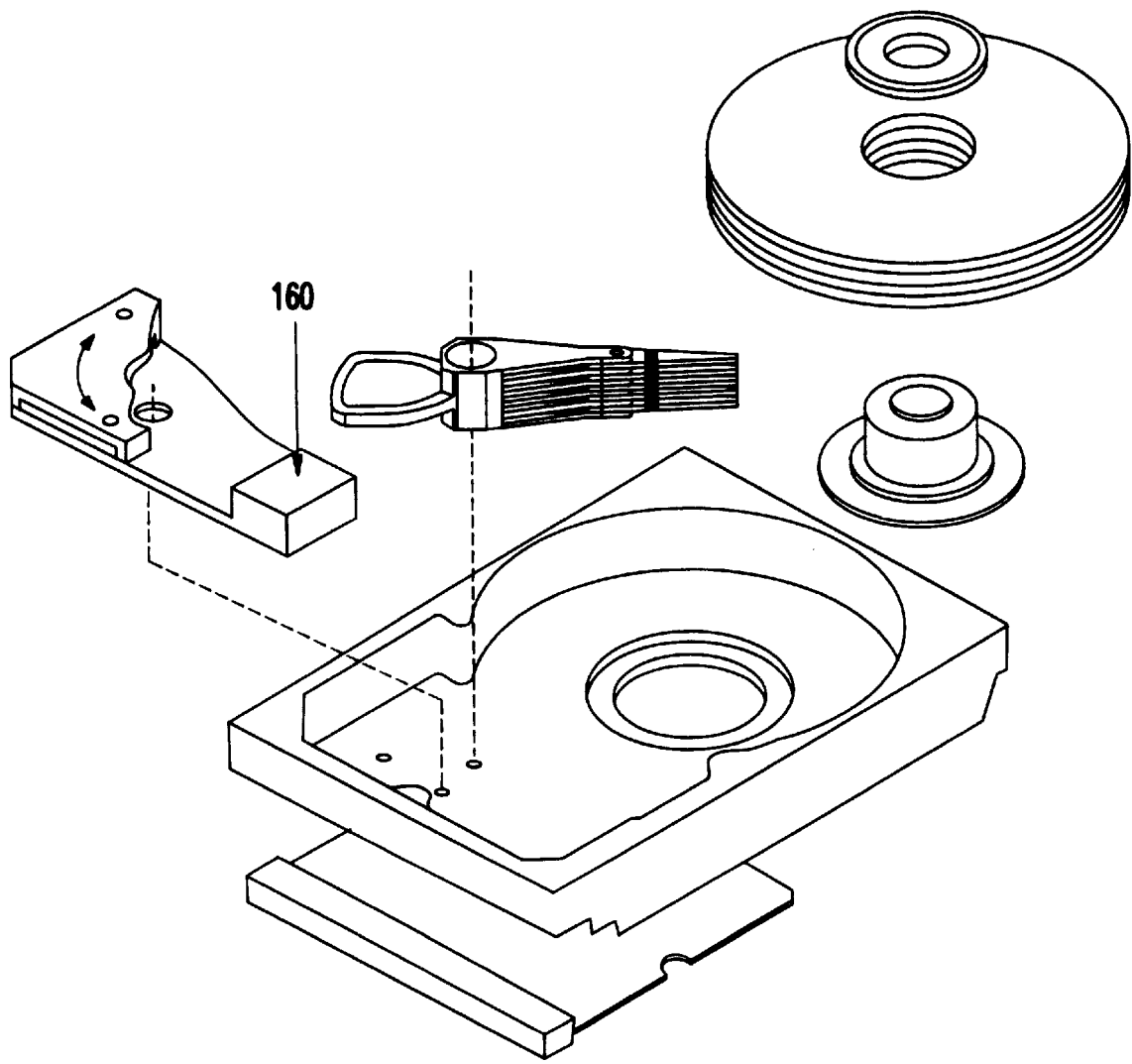
Figure 17:
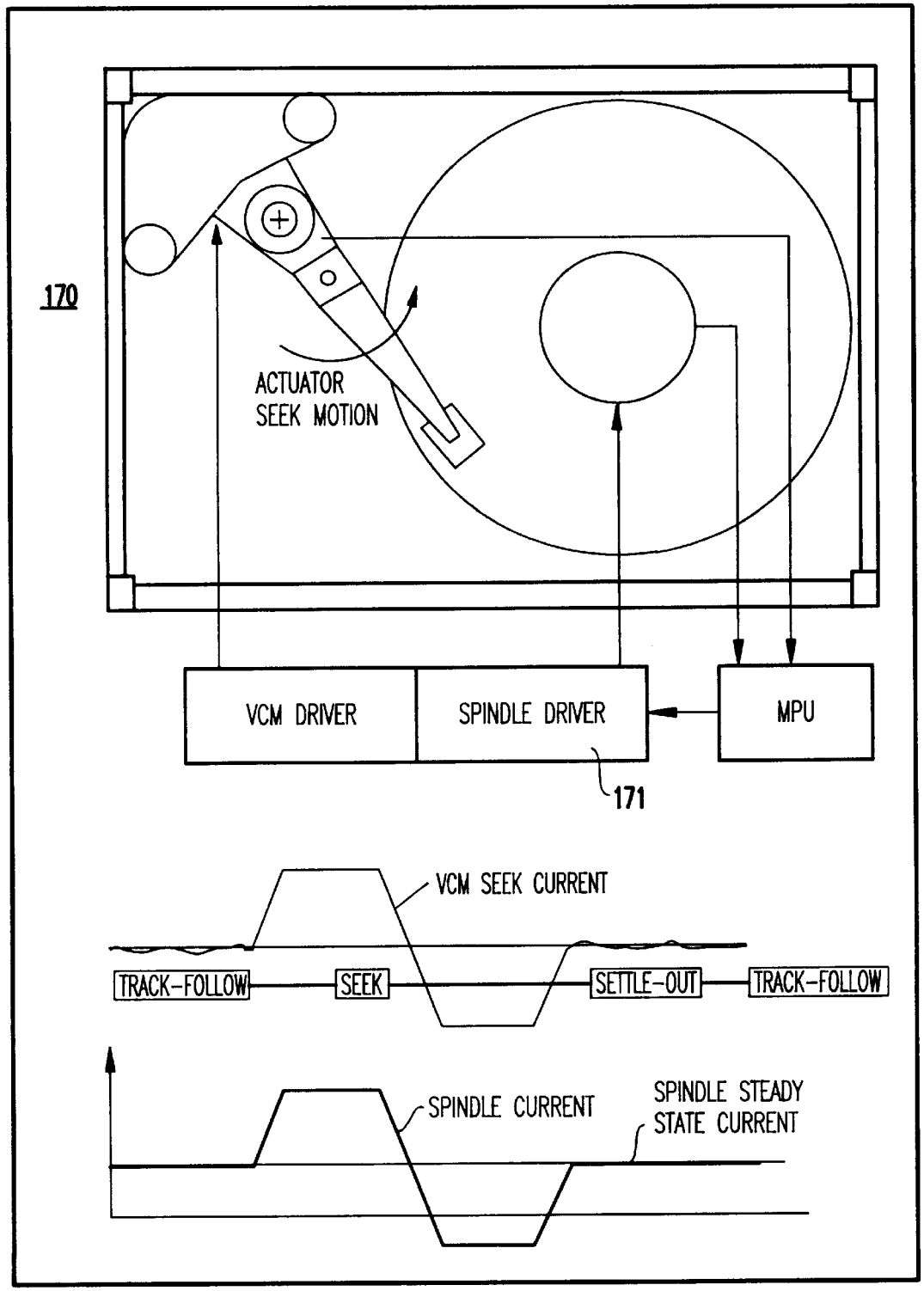

8B illustrates a mass-balanced, single moving magnet;

FIG. 9A illustrates an HDD with an external and modular solenoidtype dummy actuator;

FIG. 9B illustrates a mass-balanced, single pair of solenoids;

FIG. 10 illustrates a single actuator with a dummy counter rotating inertial element;

FIG. 11 illustrates a single actuator with two pivoting elements participating in the servo loop;

FIG. 12 illustrates two pivoting elements with a seek-VCM and a track-follow-VCM;

FIGS. 13A–13C illustrate two pivoting elements with track-follow magnets transported by a seek-VCM;

FIG. 14 illustrates a magnet/yoke structure as a rotatable assembly;

FIG. 15 illustrates a mass-balanced rotatable magnet/yoke structure;

FIG. 16 illustrates a dislocated pivoting point for the magnet/yoke assembly; and FIG. 17 illustrates the case in which spindle motor functions as the dummy actuator during seek.

DETAILED DESCRIPTION OF PREFERRED EMBODIMENTS OF THE INVENTION

Referring now to the drawings, and more particularly to FIGS. 3A–17, there is shown a sensorless method and apparatus for minimizing the seek torque induced settle-out problem. Since a seek motion in an HDD can be anticipated, the present invention takes advantage of this information to generate a synchronous counter torque employing various methods and structures described in detail below.

Figure 1A:
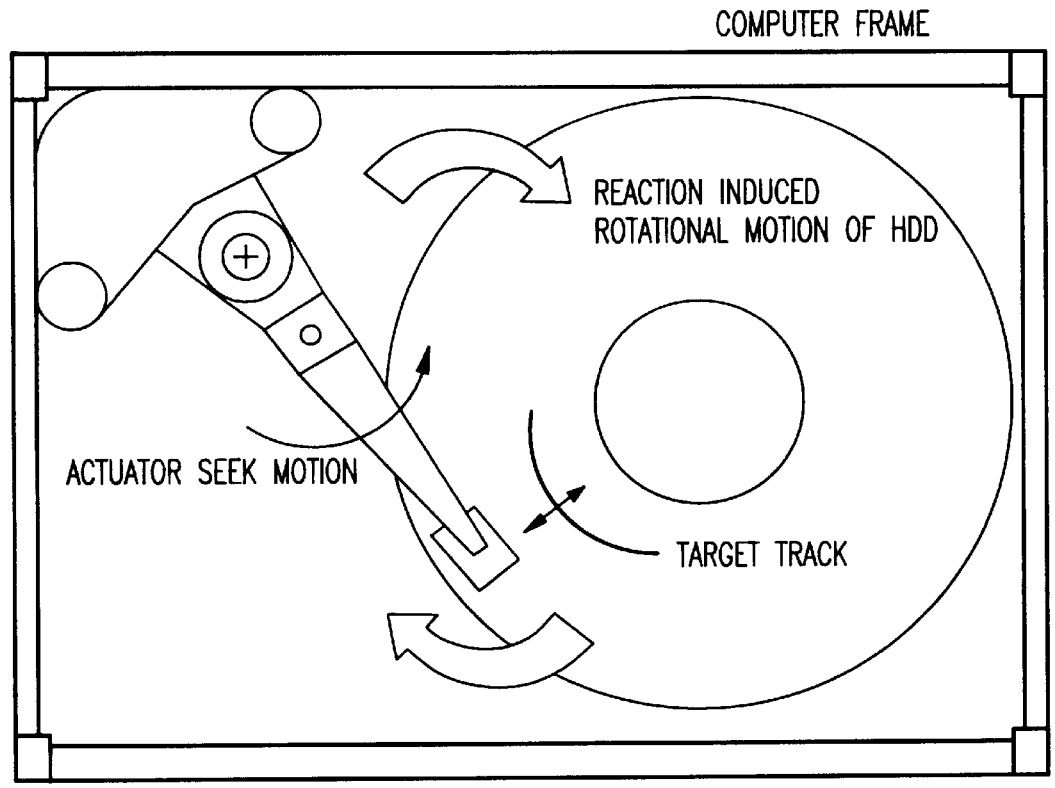
FIGS. 1A–1B respectively illustrate a conventional disk drive with seek motion and corresponding reaction induced motion of a hard disk assembly (HDA) and a target track.
Figure 1B:
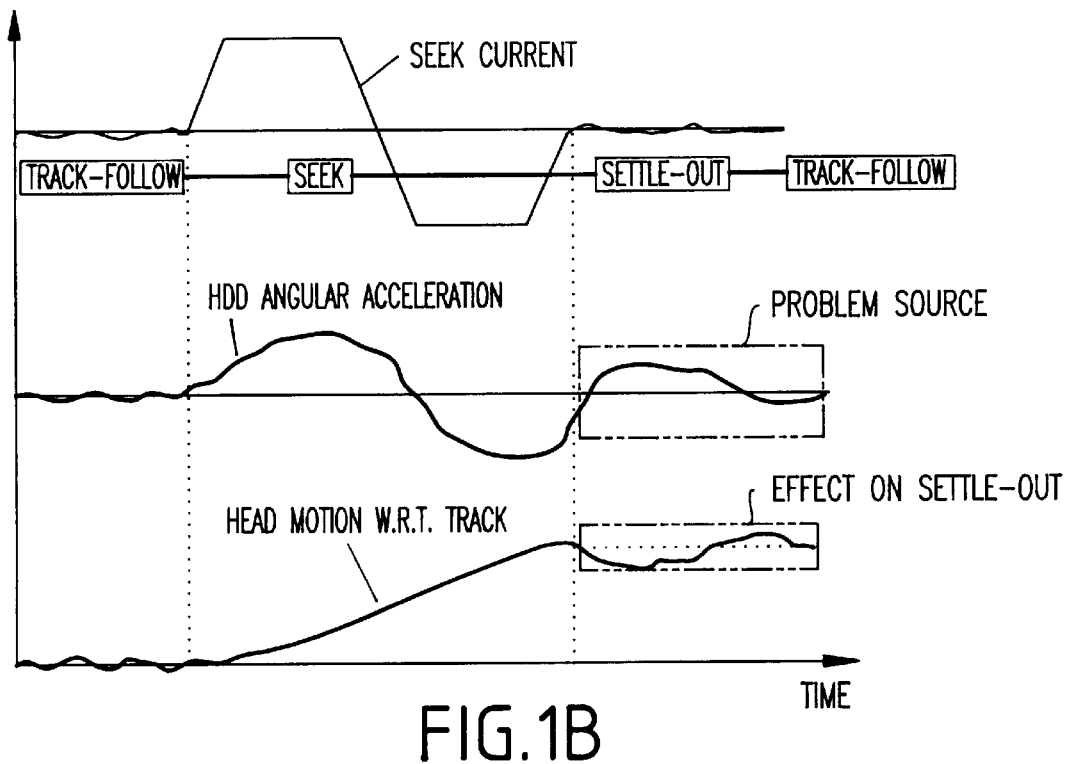

FIG. 1A shows the general layout of a conventional rotary actuatorbased hard disk drive, and FIG. 1B is a graph illustrating schematically the cause and effect due to a seek motion. During a seek, the torque applied to the actuator creates a reaction torque on the baseplate (e.g., see middle waveform of FIG. 1B indicating baseplate motion). The reaction torque, which is always equal and opposite to the actuator torque, causes the baseplate to vibrate. The vibration of the baseplate generally includes a linear component and a rotational component.

In a mass-balanced HDD actuator, the linear vibration component does not produce substantial disturbance torque on the actuator. However, the rotational vibration produces a relative track motion with respect to a read/write head, and such motion must be tracked by the positioning servo controller. Due to limited servo gain that is achievable at the frequency of the baseplate vibration (10 dB at 200 Hz), servo positioning has become increasingly a challenge.

FIGS. 2A–2C correspond to a computer simulation of an HDD positioning error signal under different conditions.

FIG. 2A shows a case when an HDD (8.6 kTPI) is mounted on a rigid computer frame. It takes about 10 ms for the PES to settle within +/− 10% of the track pitch (1 track pitch=256 bits). FIG. 2A illustrates an ideal situation for the rigid frame.

FIG. 2B shows a position error signal (PES) trajectory of a practical example of an HDD with 10 kTPI mounted on a computer frame parameterized by realistic compliance. As shown, the seek time is increased by about 13 ms.

FIG. 2C shows another practical example for an HDD having increased track density on the order of 25 kTPI where the settle-out time is increased by 30 ms.

Thus, FIGS. 2A–2C demonstrate that, with increasing track density, the compliance of a computer frame becomes critical to the overall seek performance of an HDD. The present invention provides a unique and unobvious solution to the above and other problems of the conventional systems and methods.

First Embodiment

Figure 3A:
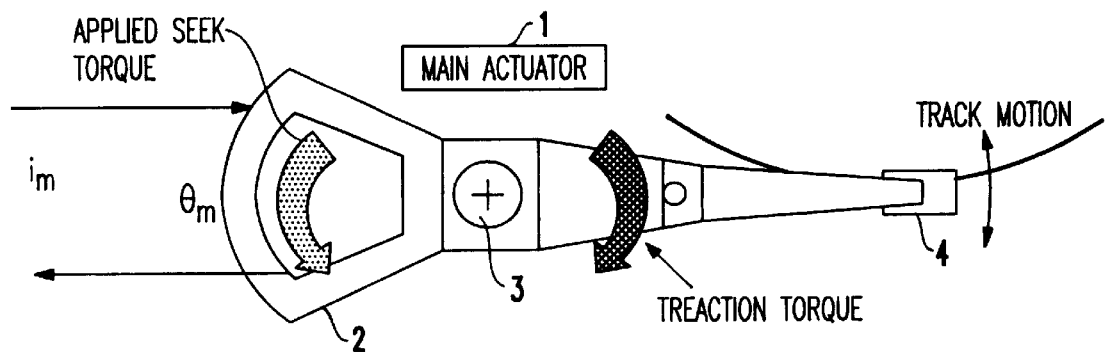
FIGS. 3A–3B respectively illustrate a mechanism of reaction torque generation and utilization of a dummy actuator to counter reaction torque.
Figure 3B:
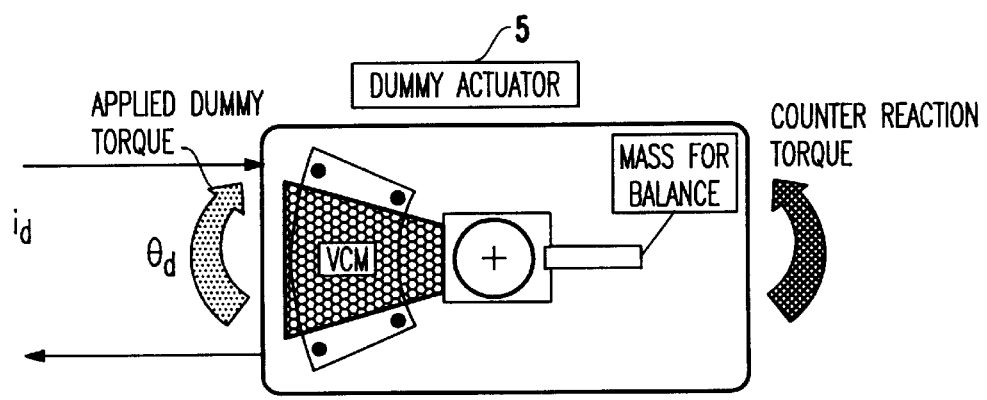

FIGS. 3A and 3B illustrate the concept of torque cancellation employing a dummy actuator according to a first embodiment of the present invention. The HDD includes a main actuator 1 having an inertia ($I_m$) and driven by a current ($i_m$). A torque constant of ($k_m$) will produce an angular acceleration ($i_m*k_m/I_m$)rad/s$^2$. As shown, the main actuator has a voice coil motor (VCM) 2, a pivot 3, and read/write head 4.

A dummy actuator 5 has a similar arrangement including a VCM, pivot point, and a mass for balance, and has an inertia ($I_d$) and is driven by a current ($i_d$). A torque constant of ($k_d$) will produce an angular acceleration ($i_d*k_d/I_d$)rad/s$^2$. Even though the main actuator 1 will be constrained to have minimum inertia and maximum angular stroke length required for a product, the dummy actuator 5 need not be limited to minimum inertia design. Based on space requirements, the dummy actuator 5 could be optimized to achieve the same torque generating capability by choosing a different inertia, stroke length and torque constant parameters. By using the dummy actuator 5 of FIG. 3B, a waveform approaching that of FIG. 2A is obtainable.

Figure 4:
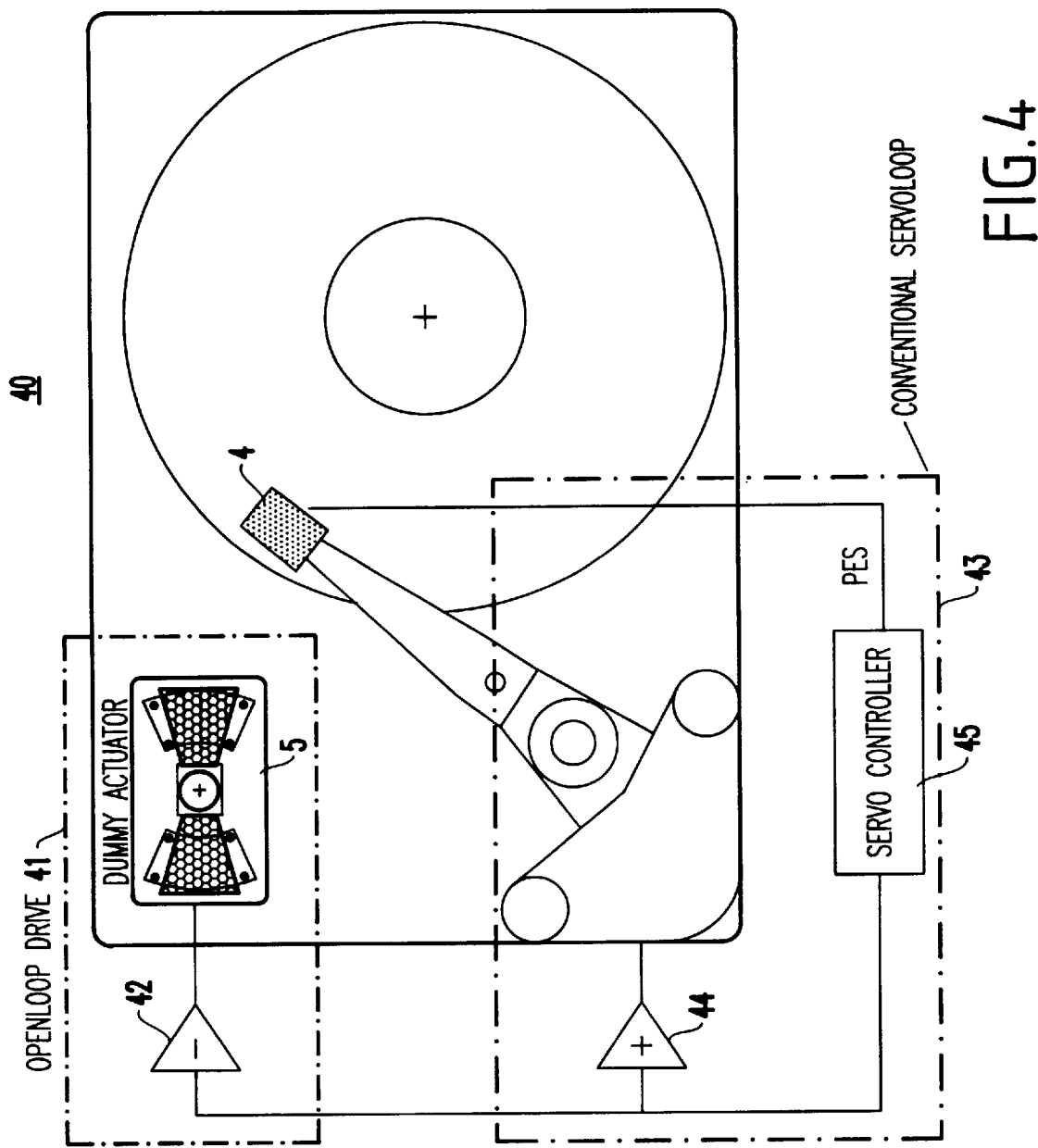
FIG. 4 is a schematic of a dummy actuator in an HDD driven synchronously by a servo controller.

FIG. 4 illustrates a practical implementation of the present invention and shows a schematic arrangement of a dummy actuator 5 in an HDD driven by the negative current command corresponding (but opposite) to the current input to the main actuator 1. In a simplest case, the dummy actuator inertia and torque constant are made identical to that of the main actuator. FIG. 4 illustrates an open loop drive 41 incorporating the dummy actuator 5 for receiving a current (e.g., negative) through an amplifier 42 or the like, and the conventional servo loop 43 incorporating the main actuator 1 for receiving a current (e.g., positive) through an amplifier 44 or the like, and a servo controller 45 for issuing a position error signal (PES) to the read/write head 4.

FIGS. 5A–5B respectively show experimental data collected with a single actuator HDD mounted in a computer frame and a twin actuator HDD mounted on the same frame.

FIG. 5A shows the positive and negative angular acceleration response (e.g., measured with accelerometers 50 or the like) due to a seek current (e.g., inside the rectangular box contained within the first 10 ms) for a conventional 3-track seek using a single actuator. The acceleration shown in this rectangular box and representing external vibration and shock, is solved by the present invention. The HDD used in the example has a strong 72 Hz PES error due to spindle imbalance as well (13.9 ms period). As shown, with a single actuator, a sinusoidal waveform is shown in the rectangular box of FIG. 5A and a clear reaction component is observed.

FIG. 5B, in which a second actuator is employed to counter the seek torque of the main actuator, shows almost no angular vibration in the first 7 ms of the seek phase. Due to spindle imbalance, the periodic vibration component starts to pick-up after 7 ms rendering the data less clear. Regardless, the residual transient vibration after the seek is more or less eliminated, and the only remaining component is dominated by the periodic spindle induced vibration at 72 Hz. The spindle imbalance and vibration is shown as the troughs of the waveform occurring over time.

Figure 6:
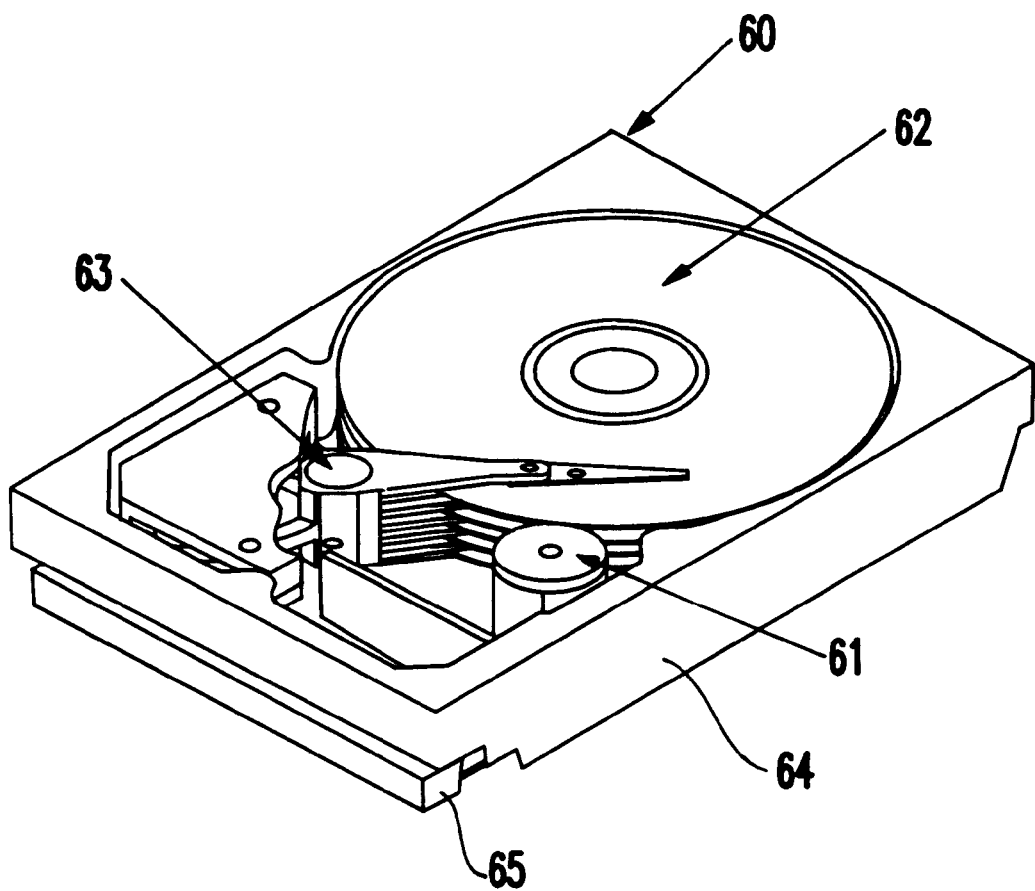
FIG. 6 illustrates an assembled HDD with an internal dummy actuator.

FIG. 6 shows an embodiment and actual implementation of the head disk assembly (HDA) 60 according to the present invention in which the counter torque generating element is assembled into the HDA itself and including an actuator assembly 63 and a dummy actuator 61. It is noted that the HDA refers to components such as the heads, disks, actuator, and base plate of the disk drive, but without including the electronics for operating the assembly, whereas a hard disk drive (HDD) refers to the entire disk drive including the electronics (e.g., electronics card, etc.) for operating the disk drive, as commonly known in the art.

Specifically, the available space near the read/write (R/W) module and connector to the electronics card (e.g., the space normally used for merging the actuator assembly 63 with the disk stack 62, has been utilized for this dummy actuator 61. The dummy actuator 61 is installed after the main components (e.g., disk stack 62, actuator assembly 63 and flex cable (unreferenced)) have been assembled and merged in a manufacturing line. A base plate 64 is shown which contains the heads, disks, and all other components. An electronic card 65 is also provided for mounting the HDA 60 thereon.

Figure 7:
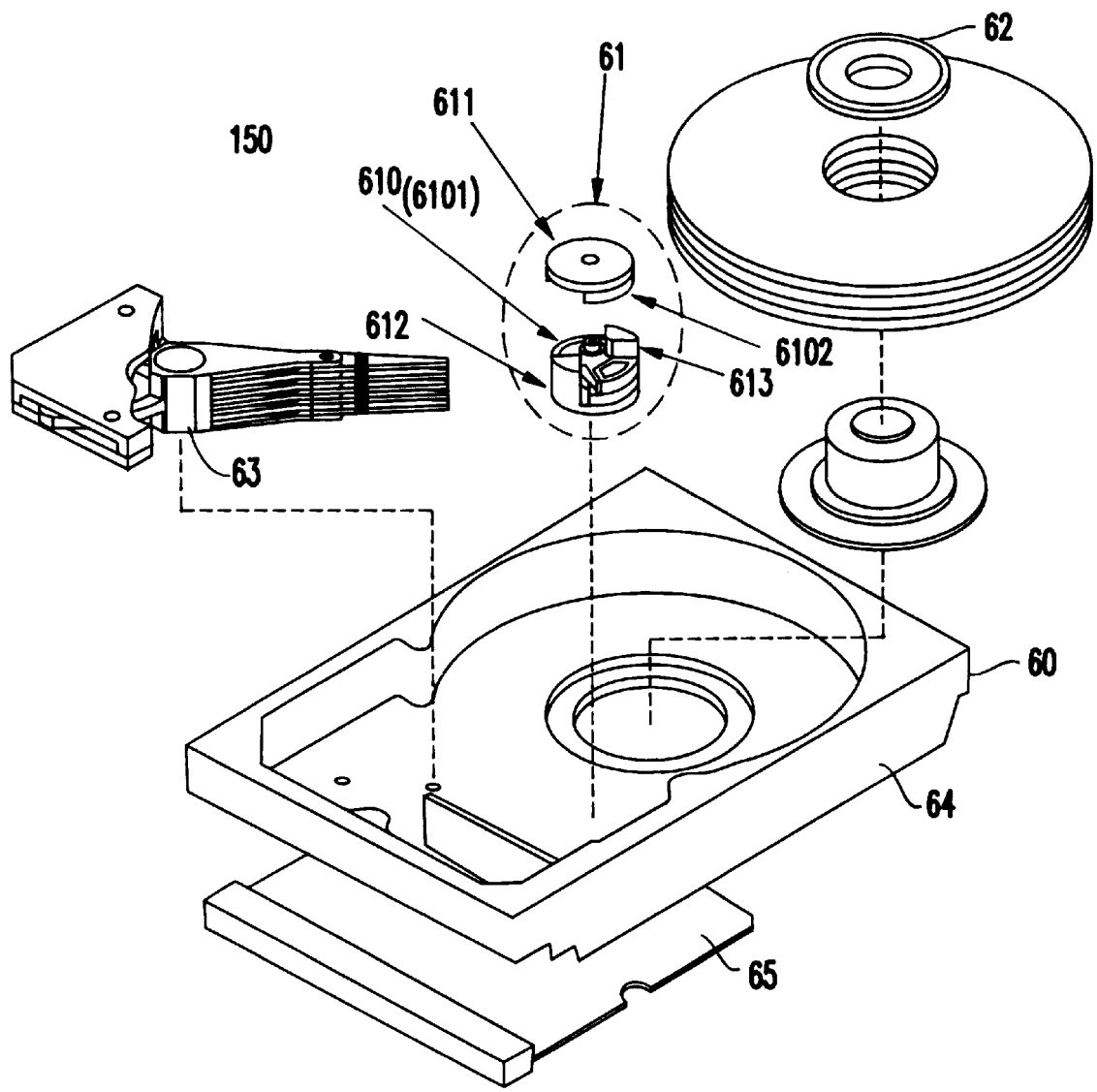
FIG. 7 is an exploded view of the HDD of FIG. 6 with the internal dummy actuator.

FIG. 7 shows the exploded view of the HDD of FIG. 6 including the dummy actuator 61 and the various assemblies (e.g., actuator assembly, disk stack, etc.) forming the HDD. The dummy actuator includes a rotating element 610 that may be either a moving magnet 6101 (with a stationary coil) or a moving coil 6102 (with a stationary magnet). Upper and lower yokes 611, 612 and a spacer 613 are positioned as shown.

Since a greater inertia can be realized from a moving magnet, such is preferable. Moving element 610 is designed to be mass-balanced about its pivot and may comprise either a dual, mirrored magnet (or coil) configuration as is shown in FIG. 6, or may be a single magnet which is counterbalanced by a dead weight 80, as shown in FIG. 8B.

The mirrored configuration has the advantage of producing a pure torque on the base plate 64. A mass balanced single magnet design will generate a linear force at its pivoting point while generating an inertial torque. This linear pivot force, though of low impact on the settle out time, may create indirect effects that are undesirable for track positioning.

The stationary components of the dummy actuator 61 include the upper and lower yokes 611, 612 with the spacer 613 to keep the yokes a predetermined distance apart, and the coils (e.g., for the case of a moving magnet design) or the magnets (e.g., in the case of a moving coil design). The choice of coils (or magnets) on both sides or on only one side of the moving element, is a design feature that is determined by the torque constant needed and other factors such as complexity and cost. There is a light rotary spring (not shown) that is attached to the moving element and is needed to return the same to a null position once the seek has been completed.

Second Embodiment

Figure 8A:
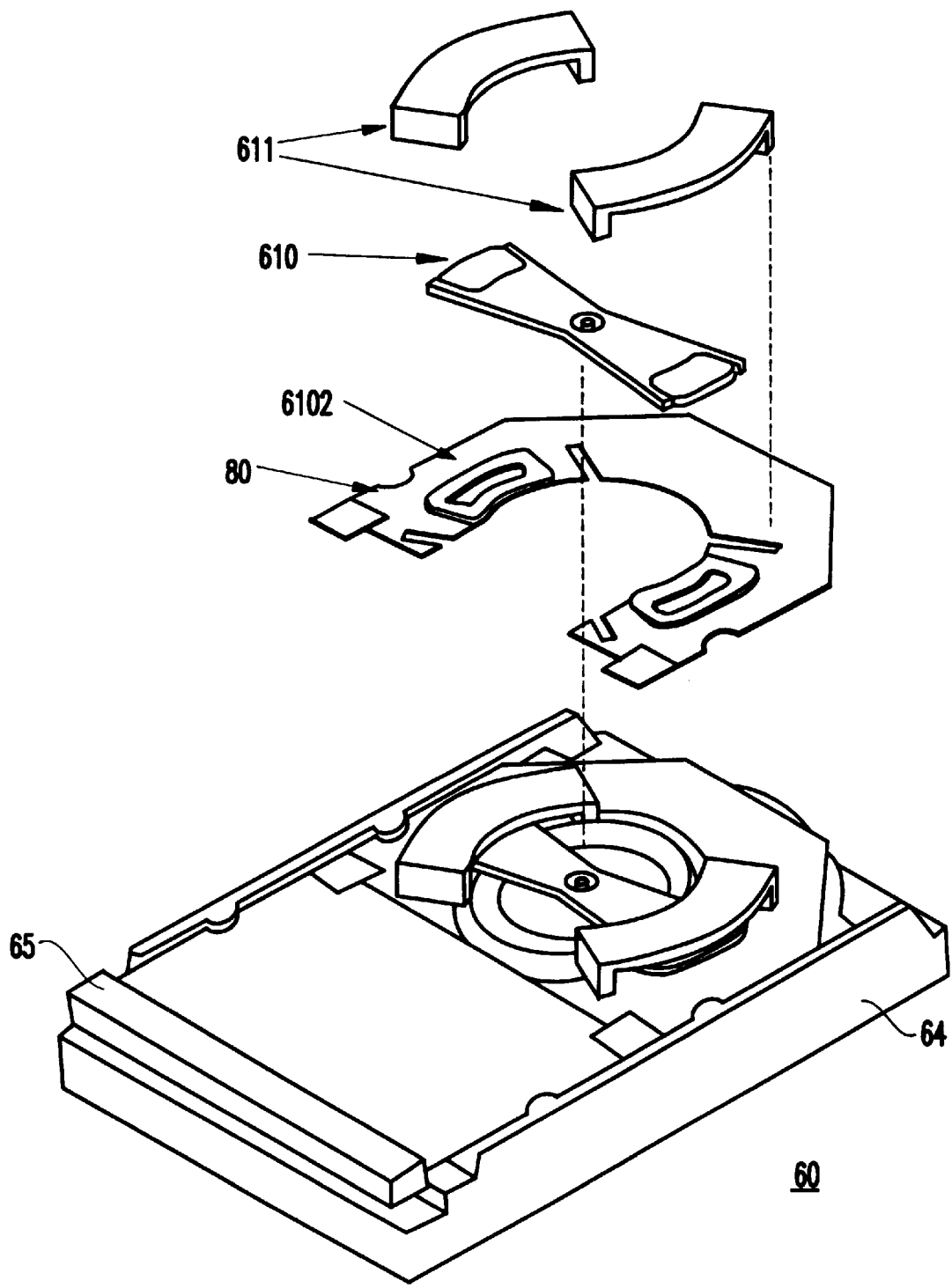
FIG. 8A illustrates an HDD with an external and modular moving magnet dummy actuator.
Figure 8B:
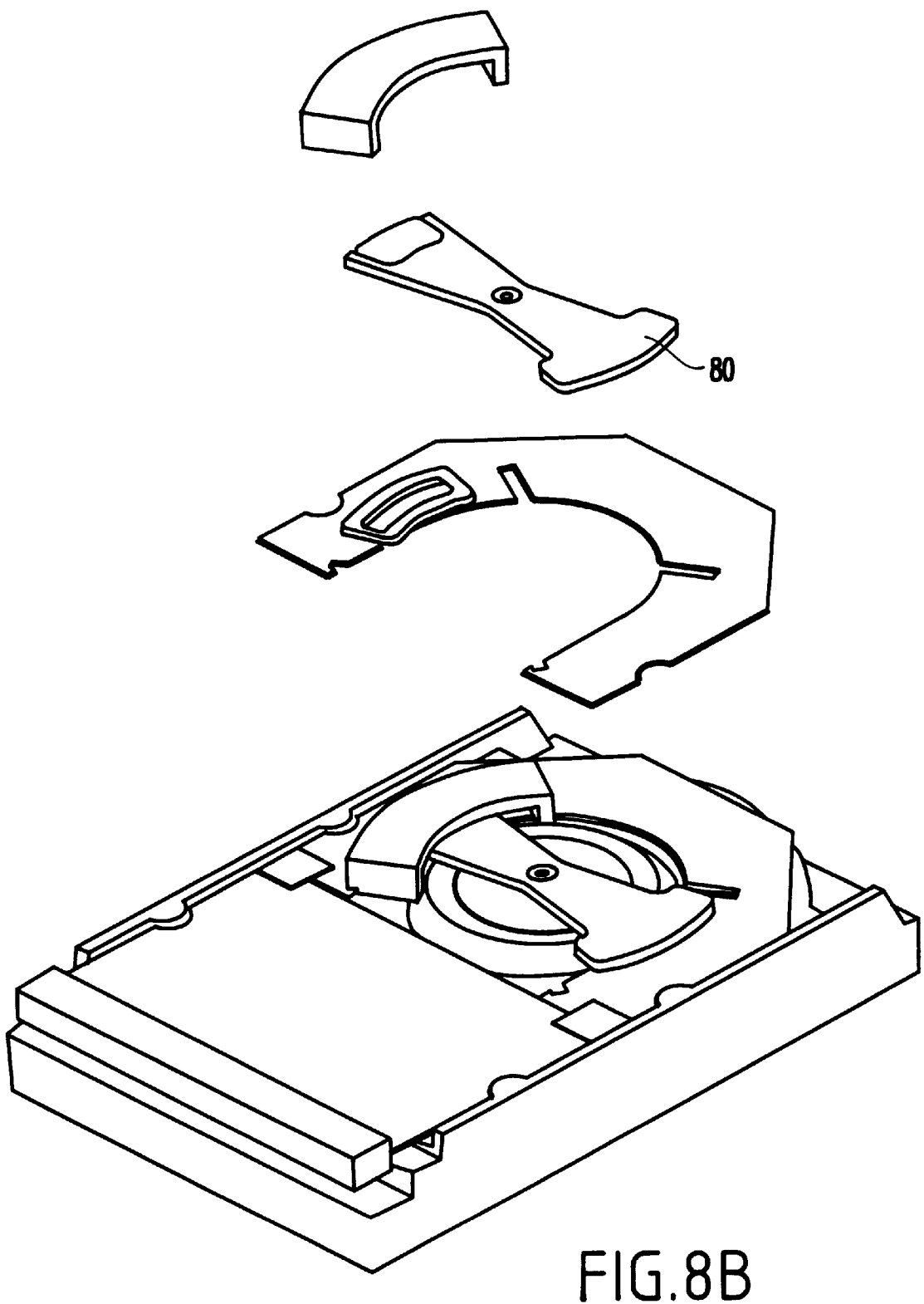

FIG. 8A shows another embodiment of the invention in which the counter torque generating element is external to the HDA assembly. This has the advantage that using a dummy actuator to increase settle out performance can be made optional to the end user. Thus, the dummy actuator can be easily retro-fitted to existing products or easily adapted to new products.

Further, this arrangement also precludes the need for two versions of the same structure (e.g., a high performance HDD with a dummy actuator and another with similar capacities but a slightly poorer settle-out time). A single HDD would suffice with the end user deciding if the extra cost of a dummy actuator was justifiable.

In FIG. 8A, the external dummy actuator is shown installed on the card side (e.g., the back side) of the HDD. This is because most 3.5" drives utilize a half-sized electronic card. The HDD real estate around the vicinity of the voice coil motor (VCM) is generally free. In the present invention, the dummy actuator 61 is preferably fabricated on a circuit card (e.g., circuit board 80) that can be attached in this area and, for convenience, be inserted (e.g., plugged) directly into connectors at the end of the existing electronics card.

In FIG. 8A, a dual magnet (e.g., mirrored and counterbalanced) design actuator system is again shown. The choice of moving coils or single elements are an alternate design option. In FIG. 8A, the coils 6102 are shown attached directly to the circuit board 80. For convenience and ease of understanding by the reader, not shown is a lower yoke, between the coils and the HDD below, that provides a return path for the magnetic flux and also shields the inside of the HDD from stray magnetic fields from the dummy actuator 61.

Above the rotating element 610 (e.g., the moving magnet in the moving magnet design, but of course the moving coils in the moving coil design as would be known by one of ordinary skill in the art), another set of coils (not shown here) may be provided and finally the upper yoke 611.

As mentioned above, a dead weight arrangement may be provided as shown in FIG. 8B.

FIG. 9A shows a variation to the embodiment shown in FIG. 8A. In FIG. 9A, the principle is substantially the same as in FIG. 8A, but instead of using a voice coil arrangement, simple coils 90, mounted on a circuit board 91, are used with a rotating element 92 (e.g., a moving soft-iron core 92).

In operation, when the coils 90 are energized, the coils 90 "pull" (e.g., attract) the iron core 91 towards them. For example, a plurality of coils (e.g., four coils) are placed diametrically opposite as shown in FIG. 9A. Only one set of opposite coils is energized at a time. The coils 90 pull the core 92 towards the coils, thereby creating a pure torque force on the core 92, and thus on the base plate 64. The other two coils are used to generate the torque in the other direction. The balanced coils 90 could be replaced by a single coil 90' (e.g., as shown in FIG. 9B) at the expense of generating a linear force along with the counterbalancing torque. A light rotary spring (not shown in FIGS. 8A and 9A) is attached to the rotating element 92 to return it to a null position after the seek has been completed.

Thus, FIG. 9A illustrates a system substantially similar to that of FIG. 8A, with the exception of showing a solenoid with a moving core. Such a system results in lower cost and more power being produced.

Third Embodiment

FIG. 10 shows an embodiment in which the net reaction torque is eliminated mechanically as opposed to electronically as described above, and specifically includes a single actuator 100 which is used for eliminating the net reaction torque on the baseplate. A dummy inertia 101 is coupled to the main actuator 100 through an interface 102.

The interface 101 can be a friction driven surface 102A or alternatively it could be a gear arrangement 102B. In the case of continuous connection between the main actuator 100 and the dummy inertia 101, the seek as well as track follow characteristics are affected by the inclusion of the dummy inertia 101.

However, in designs where the dummy inertia 101 is not required during track-follow mode, continuous interface produces a negative effect. A geared system can be optimized so that an intentional clearance between mating gear surfaces is provided so that the gears appear ineffective (or detached) during track-follow, but effective when needed during seeks of substantial length. Based on FIG. 10, the required relationship for torque cancellation is:

$$[I_1 * \theta_1] = [I_2 * \theta_2].$$

FIG. 11 shows a case where all moving components in the actuator play an active role in creating the seek as well as track-follow compensating motion while maintaining a zero net angular moment. Thus, in FIG. 11, there is no dummy actuator employed. In FIG. 11, the moving components must be mass balanced appropriately so that the center of gravity of each pivoting member is located at its own pivot. Two different configurations are shown in FIG. 11.

FIG. 12 shows a two-pivoting-element design 120 with two actuators 121, 122, linked by a geared mating surface 123. The actuators 121, 122 are pivotable about their respective pivots points 121A and 122A.

In this design, the seek motion is activated by the first actuator 121 (e.g., a seek-VCM). The second actuator 122 (e.g., a track-follow-VCM) is used to maintain a chatter-free seek motion by generating an appropriate bias force against the mating surface 123.

During track follow, only the pure torque generating member (e.g., part 122B) is activated. The gear clearance (as discussed above with regard to FIG. 10) provided between the mating surface facilitates automatic detachment of the seek-VCM 121 from the track-follow-VCM 122. In this embodiment, the track-follow-VCM structure 122 must be designed to cover the full stroke length of the actuator system.

FIG. 13A schematically shows a modified two-pivoting-element/two-actuator system 130 and is a modification of FIG. 12 in that a plurality of track-follow-VCM magnets 131 are transported on the seek-VCM assembly 121 (e.g., carried by Part 1 as shown). Therefore, the stroke length of the track-follow-VCM assembly needs to cover only a few track lengths, and it allows the magnet/VCM design to be compact.

FIG. 13B is a side cross-sectional view of the two-pivoting element/two-actuator system, and FIG. 13C is a detailed cross-sectional view of the track-follow VCM system. As shown in FIG. 13C, a magnet assembly 132 is shown on first and second sides of the track follow system. Within the assembly 132, magnetic flux 133 is produced. The track-follow-VCM is provided as shown, along with a geared interface 134 for the seek motion. Reference numeral 122 represents the track-following VCM-coil attached to Part 2 (e.g., element 122B).

Third Embodiment

As shown in FIGS. 14–16, a third approach to generating counter torque is to form the main voice coil motor (VCM) actuator as a single body pivoting about its pivot axis, while allowing the VCM magnet/yoke assembly to help reduce the reaction torque transmitted to the baseplate by a novel redesign.

FIG. 14 shows an embodiment of the invention that provides reaction torque minimization using a rotatable magnet/yoke assembly 140. The torque, imparted to the actuator during a seek, results in a reaction torque on the baseplate of the HDD that is transmitted through the magnet/yoke structure 140 and the actuator pivot.

In the third embodiment, the reaction component is minimized by allowing the magnet/yoke structure 140 to rotate freely under this torque loading. Hence, the effective torque acting on the baseplate is minimized but not completely eliminated.

In FIG. 14, the rotation is provided by mounting the magnet/yoke structure 140 on a pivot system 141. The center of rotation of this pivot 141 is made substantially the same as that of the actuator with a ball bearing system (not illustrated) being provided for the pivot. To minimize the size of this bearing system, further support in the form of, for example, a sliding/rolling contact can be provided at the extremity of the yoke furthest away from the pivot point. By making the yoke pivot at the same point as the actuator pivot, the reaction force that the yoke imparts to the pivot cancels out the force that the actuator imparts to the pivot point.

Thus, the third embodiment not only cancels out the torque component, but also reduces the net linear force acting on the baseplate at the pivot point. Since the mass and moment of inertia of the magnet/yoke structure is significantly greater than that of the actuator, the degree of motion allowed to the magnet/yoke structure 140 can be much lower than the full motion that the actuator will undergo.

The yoke structure in FIG. 14 is not mass-balanced about the pivot like the VCM actuator since slight motions imparted to the yoke, due to external vibrations acting on its off-centered center of mass, will not impact the track following ability of the actuator. Due to the motion of magnet/yoke center of mass during seek, the force on its pivot axis is modified proportionally to the acceleration seen by its center of mass, rendering the force and torque cancellation suboptimum.

However, if exact torque cancellation is desired, the yoke structure of FIG. 14 can be modified to produce a mass-balanced yoke structure, as shown in FIGS. 15 and 16. It is noted that, in most HDD designs, there is very little space available for balancing the mass of the yoke since this would require space currently taken up by the actuator itself.

In FIG. 15, a balancing mass 150 is provided such that it occupies the free space available between the disks in the disk stack. A drawback of this design is the potential difficulty in assembling the entire disk-yoke-actuator structure.

Alternatively, the design shown in FIG. 16 can be employed in which the pivot point of the yoke is moved away from that of the actuator and away from the disk stack. Thus, a balancing mass 160 can be made to occupy the open space that is available in the area that the flex cable (not shown in FIG. 16) typically uses. This design may require a change in the routing of the flex cable. Further, the loss of the common pivot point means that the linear forces, imparted by the actuator and the yoke, on the pivot are no longer acting at the same point. However, if the pivot point of the yoke is chosen such that these forces act near parallel to each other, the negative impact of this design can be minimized.

Fourth Embodiment

A fourth embodiment of the present invention exploits the HDD's spindle motor as the "dummy actuator" to generate the counter torque during the seek, as shown in the system 170 of FIG. 17. This approach allows the existing spindle motor hardware to be exploited without additional cost. However, modifying the traditional function provided by the spindle motor poses other performance and design challenges.

A key concern area is the spindle motor speed variation caused by the counter torque-generating function. However, provided that the track positioning information can be innovatively measured under varying motor speed, the actuator-induced seek reaction torque is counter-balanced by applying a counter torque to the spindle motor by a spindle driver 171.

Conventional HDD electronics and magnetic configuration require that the motor speed be regulated rather tightly (+/−0.5% variation) in order to read the position error information prewritten on the disk. If the spindle motor is subjected to generate the counter torque during seek, then the spindle speed is forced to change well above the conventional margins. Decoding of track position information under a steady spindle speed has been the state of the art. Under a predictable and variable spindle speed condition, decoding of track position information during seek and possibly settle-out motion requires further sophistication in the electronic circuits.

Thus, with the fourth embodiment, by innovating the track position generation method and seek servo system design, a new low-cost solution employing the spindle motor itself as the "dummy" actuator is provided.

Thus, the present invention provides an improved disk drive system which is extremely robust against vibration and which solves (or at the very least minimizes) the problem of transient dynamics caused by actuator seek motion. Specifically, the invention overcomes such a problem and others by generating a synchronous counter torque without using a motion sensor for baseplate acceleration sensing.

In the system of the present invention, the net angular momentum, which is a vector sum of all individual angular momenta, is maintained at zero. To maintain such a zero angular momenta, the invention employs electronic synchronization of two independently rotatable components (e.g., solves the seek induced vibration problem by explicitly generating a synchronous counter torque by providing a second independent rotary actuator). Preferably, the torque canceling actuator either may be a dummy actuator that is uniquely designed for torque cancellation, or may be a second actuator intended to transport a subset of read/write (R/W) heads.

Alternatively, the present invention maintains synchronous momentum (and therefore torque) control mechanically.

Further, the above-mentioned problem may be solved by modifying a single actuator system design so that the net inertial angular momentum due to the actuator motion is kept at zero so that the baseplate is not subject to a net torque. Hence, in this case, only a single torque generating seek actuator is used with novel modification. With this approach, only one actuating device is required, thereby contributing to lower component cost.

While the invention has been described in terms of several preferred embodiments, those skilled in the art will recognize that the invention can be practiced with modification within the spirit and scope of the appended claims.

Having thus described our invention, what we claim as new and desire to secure by Letters Patent is as follows:

1. A disk drive system, comprising:
   an arm for mounting a head;
   at least one component, coupled to said arm; and
   a device for synchronizing said at least one component to maintain a zero net angular momentum of said arm and said at least one component.

2. The system according to claim 1, wherein said arm is synchronized electronically.

3. The system according to claim 1, wherein said arm is synchronized mechanically.

4. The system according to claim 1, wherein said at least one component includes first and second independently rotatable actuators,
   one of said first and second actuators being an actuator for generating a synchronous counter torque to that of the other of said first and second actuators.

5. The system according to claim 1, wherein said at least one component includes first and second independently rotatable actuators, and
   wherein one of said first and second actuators comprises one of a dummy actuator for torque cancellation, and a second actuator for transporting a subset of said head, said head comprising a read/write (R/W) head.

6. The system according to claim 1, wherein said at least one component includes first and second independently rotatable actuators, and
   wherein one of said first and second actuators comprises a dummy actuator for cancellation of torque generated by the other of said one of said first and second actuators,
   the system according to claim 1, wherein said at least one component comprises first and second actuators, linked together by a geared mating surface, said first and second actuators being pivotable about their respective pivots points,
   wherein a seek motion is activated by said first actuator and a track-follow motion is activated by said second actuator,
   said second actuator for maintaining a substantially uniform seek motion by generating a bias force against the mating surface.

7. The system according to claim 1, wherein said at least one component includes first and second independently rotatable actuators, and
   wherein one of said first and second actuators comprises a second actuator for transporting a subset of said head, said head comprising a read/write (R/W) head.

8. The system according to claim 1, wherein said at least one component includes first and second independently rotatable actuators,
   wherein one of said first and second actuators is for generating a synchronous counter torque to that of the other of said first and second actuators,
   said first and second actuators being paired for seek movement of said head, without constraining the other of said one of the first and second actuators from reading/writing.

9. The system according to claim 1, wherein said at least one component comprises 2n actuators (where n=1, 2, . . . ) such that n actuators perform seek and read/write functions independently while the other n actuators are employed to generate a counter torque associated with a corresponding read/write actuator of said n actuators.

10. The system according to claim 1, wherein said at least one component comprises an odd number of a plurality of actuators,
    said plurality of actuators being paired such that n actuators perform seek and read/write functions independently while the other n actuators are employed to generate a counter torque associated with a corresponding read/write actuator of said n actuators,
    a last unpaired actuator being idle while the paired ones of said plurality of actuators are used for synchronous torque cancellation.

11. The system according to claim 1, further comprising a base plate on which said at least one component is mounted,
    wherein said at least one component comprises a single actuator provided such that the net inertial angular momentum due to the actuator motion is maintained at zero such that the baseplate is not subject to a net torque.

12. The system according to claim 1, wherein said at least one component includes an actuator having a voice coil motor, a pivot coupled between said voice coil motor and said head, wherein said at least one component further comprises a dummy actuator for achieving a same torque generating capability by choosing a different inertia, stroke length and torque constant parameters.

13. The system according to claim 1, wherein said at least one component includes a main actuator having a voice coil motor, a pivot coupled between said voice coil motor and said head, wherein said at least one component further comprises a dummy actuator for achieving a same torque as that of said main actuator such that an inertia and torque constant of said dummy actuator are made substantially identical to those of said main actuator.

14. The system according to claim 13, wherein said dummy actuator compensates for external vibration and shock.

15. The system according to claim 1, wherein said at least one component includes a main actuator and a second actuator for countering a seek torque of said main actuator.

16. The system according to claim 1, further comprising a housing for housing said at least one component and said arm, wherein said at least one component comprises a counter torque generating element assembled into said housing.

17. The system according to claim 16, wherein said counter torque generating element includes a dummy actuator, said dummy actuator including a rotating element, said rotating element comprising one of a moving magnet with a stationary coil, and a moving coil with a stationary magnet.

18. The system according to claim 17, wherein said rotating element is mass-balanced about its pivot and comprises one of a dual-mirrored magnet, a dual-mirrored coil, and a single magnet which is counterbalanced by a dead weight.

19. A system according to claim 1, wherein said at least one component comprises a counter torque generating element provided internal to the disk drive system.

20. A system according to claim 1, wherein said at least one component comprises a counter torque generating element provided external to the disk drive system.

21. A system according to claim 20, wherein said at least one component comprises an actuator, said actuator comprising a voice coil motor comprising a dual-mirrored and counterbalanced magnet, and coils attached directly to a circuit board.

22. The system according to claim 20, wherein said counter torque generating member comprises an actuator, said actuator comprises coils mounted on a circuit board, and said coils are employed with a rotating element comprising a moving soft-iron core, such that when the coils are energized, the coils attract the iron core, wherein a plurality of said coils are placed diametrically opposed, with one set of opposed coils being energized at a time.

23. The system according to claim 1, further comprising a baseplate for mounting said arm and said at least one component, wherein said at least one component comprises a single actuator for eliminating a net reaction torque on the baseplate, wherein a dummy inertia is coupled to the single actuator through an interface.

24. The system according to claim 23, wherein said interface comprises one of a friction-driven surface and a gear arrangement.

25. The system according to claim 23, wherein said at least one component includes a single actuator, and wherein all moving components in the actuator create a seek compensating motion and track-follow compensating motion while maintaining a zero net angular moment, the moving components being mass-balanced such that a center of gravity of each pivoting member is located at its own pivot.

26. The system according to claim 1, wherein said at least one component comprises first and second actuators, linked together by a geared mating surface, said first and second actuators being pivotable about their respective pivots points, wherein a seek motion is activated by said first actuator and a track-follow motion is activated by said second actuator, said second actuator for maintaining a substantially uniform seek motion by generating a bias force against the mating surface.

27. The system according to claim 26, wherein said first actuator includes a plurality of track-follow-voice coil motor magnets transported thereon.

28. A disk drive system including a read/write head, comprising:

a torque counter-generating member; and a device for synchronizing said torque counter-generating member to maintain a zero net angular momentum of said head.

29. The system according to claim 28, wherein said torque counter-generating member comprises a single actuator with a single, mass-balanced moving actuator having a concentric pivoting point.

30. The system according to claim 28, wherein said torque counter-generating member comprises a single actuator with a single, mass-balanced moving actuator having a nonconcentric pivoting point.

31. The system according to claim 28, wherein said torque counter-generating member comprises a spindle-motor.

32. The system according to claim 28, further comprising an actuator for actuating said head, and a housing for housing said actuator, wherein said torque counter-generating member comprises a second, dummy actuator externally and modularly coupled to said housing.

* * * * *